United States Patent [19]

Uchida et al.

[11] Patent Number: 5,896,424

[45] Date of Patent: Apr. 20, 1999

[54] INTERFERENCE RADIO WAVE ELIMINATION DEVICE AND INTERFERENCE RADIO WAVE ELIMINATION METHOD

[75] Inventors: Yoshinori Uchida; Shinichi Satoh, both of Tokyo, Japan

[73] Assignee: Mitsubishi Denki Kabushiki Kaisha, Tokyo, Japan

[21] Appl. No.: 08/726,653

[22] Filed: Oct. 7, 1996

[30] Foreign Application Priority Data

Mar. 27, 1996 [JP] Japan .................................. 8-072828

[51] Int. Cl.$^6$ .............................. H04B 1/10; H04B 7/15
[52] U.S. Cl. ...................... 375/346; 375/349; 455/303; 455/312
[58] Field of Search .................... 375/284, 285, 375/327, 346, 348, 349; 455/254, 284, 296, 303, 309, 312; 329/318–320, 349, 351, 353

[56] References Cited

U.S. PATENT DOCUMENTS

| | | | |
|---|---|---|---|
| 4,027,264 | 5/1977 | Gutler | 455/306 |
| 4,246,541 | 1/1981 | Ishigaki | 329/316 |
| 4,320,523 | 3/1982 | Horikawa et al. | 375/350 |
| 4,908,581 | 3/1990 | Honjo | 329/320 |
| 5,089,917 | 2/1992 | Kanota et al. | 360/45 |
| 5,111,484 | 5/1992 | Karabinis | 375/340 |
| 5,410,750 | 4/1995 | Cantwell et al. | 455/306 |
| 5,469,465 | 11/1995 | Birchler et al. | 375/346 |
| 5,510,743 | 4/1996 | Shi | 327/165 |
| 5,694,437 | 12/1997 | Yang et al. | 375/346 |

FOREIGN PATENT DOCUMENTS

| | | |
|---|---|---|
| 63-177630 | 7/1988 | Japan . |
| 4-284031 | 10/1992 | Japan . |
| 2 174 576 | 11/1986 | United Kingdom . |

*Primary Examiner*—Young T. Tse
*Attorney, Agent, or Firm*—Burns, Doane, Swecker & Mathis, LLP

[57] ABSTRACT

An interference radio wave elimination device receiving input signals including desired radio frequency signals and interference radio frequency signals that interferences desired radio frequency signal, and then eliminates the interference radio frequency signals. First, an amplifier amplifies the interference radio frequency signal. A digital demodulator (17) demodulates the interference radio frequency signals amplified by the amplifier. A digital modulator (18) modulates the internal carrier signal to make interference radio frequency signals in a digital form by using the demodulated interference information. An adder (21) eliminates the interference radio frequency signals of the digital form from the input signals.

4 Claims, 15 Drawing Sheets

INTERFERENCE RADIO WAVE ELIMINATION DEVICE AND INTERFERENCE RADIO WAVE ELIMINATION METHOD

BACKGROUND OF THE INVENTION

1. Field of the Invention

The present invention relates to an interference radio wave elimination device and method for eliminating interference radio waves in radio frequency signals in radio communication system or mobile radio and cellular communication systems, and more particularly, it relates to an interference radio wave elimination device and method for preventing the signal in its own channel from degradation caused by interference radio waves transmitted in the adjacent channels or other channels.

2. Description of the Prior Art

For example, in mobile radio communication systems, each system comprises mobile stations as mobile units such as vehicle communication units and small, hand-held, pocketable communication units (hereinafter referred to as "vehicle communication units" and "pocketable communication units", respectively) and base stations that communicate these mobile stations through radio channels. Between the mobile stations and base stations, a frequency-division multiple access (FDMA) method is widely used for radio communication because each of devices using this FDMA method is simple in technique and configuration.

In the following description relating to a conventional mobile radio communication system, it is assumed that mobile stations receive signals transmitted from the base stations through a predetermined frequency channel (or a desired communication channel). In this case, because communication is performed based on FDMA method, there are adjacent channels which are separated from the main communication channel with a constant frequency difference to relative each other. Interference radio waves which interfere with desired radio frequency signals are transmitted to the desired communication channel. When a movable station receives information transmitted from base stations through a frequency channel allocated to this movable station, it happens that the operation of the mobile station is affected by interference radio waves transmitted from adjacent frequency channels. In this interference, the mobile station causes decoding error signals by the interference radio waves from the adjacent frequency channels. In this case, in the conventional communication system such as the mobile radio communication system, the mobile station abandons this frequency channel allocated to this mobile station, and then the mobile station gets other frequency channel where there is a few interference caused by the adjacent frequency channels. That is, the mobile station (or the same cell) solves this problem by performing a hand-off operation in order to escape from the interference radio waves from the adjacent channels.

The following are documents relating to the conventional mobile radio communication system described above:

Japan Laid-open publication number: JP-A-63/177630, and

Japan Laid-open publication number: JP-A-4/284031. The former discloses the technique to detect the magnitude of interference caused from adjacent channels and the latter discloses the technique that the burst synchronous wave of its own station is in synchronism with the burst synchronous wave of interference radio waves.

SUMMARY OF THE INVENTION

Accordingly, an object of the present invention is, with due consideration to the drawbacks of the conventional mobile radio communication system, to provide an interference radio wave elimination device and method for eliminating interferences caused by interference radio waves to interference desired radio frequency signals and for keeping receiving states of the desired frequency signals a good condition during transmission.

In accordance with a preferred embodiment of the present invention, an interference radio wave elimination device eliminates interference radio frequency signals from input signals including desired radio frequency signals modulated into a digital form and interference radio frequency signals.

The interference radio wave elimination device comprises: an interference radio frequency signal choosing means for choosing interference radio frequency signals, a digital demodulation means for demodulating the interference radio frequency signals chosen by the interference radio frequency choosing means into a digital form and for generating internally reproduced internal radio frequency signals, a digital modulation means for modulating internal transmission waves based on interference information obtained by the demodulation process executed by the digital demodulation means, and an interference radio frequency signal elimination means for eliminating the interference radio frequency signals from the input signals by using the internally reproduced interference radio frequency signals modulated by the digital modulation means.

In accordance with another preferred embodiment of the present invention, the interference radio wave elimination device further comprises: a delay means for delaying the input signals in time and the delay means provides delayed input signals to the interference radio frequency signal elimination means.

In accordance with another preferred embodiment of the present invention, the interference radio wave elimination device further comprises: an adjustment means for adjusting the signal level of the internally reproduced interference radio frequency signals outputted from the digital modulation means.

In accordance with another preferred embodiment of the present invention, the interference radio wave elimination device for eliminating a plurality of interference radio frequency signals included in input signals, which comprises: a plurality of stages. Each stage comprises: an interference radio frequency signal elimination means, a digital demodulation means, and a digital modulation means.

In accordance with another preferred embodiment of the present invention, the interference radio wave elimination device further comprises: a control means for controlling elimination operation for eliminating interference radio frequency signals corresponding to time slotted signals included input signals.

In accordance with another preferred embodiment of the present invention, the interference radio wave elimination device comprises: a phase difference detection means for detecting phase differences between the interference radio frequency signals included in the input signals which are provided to the interference radio frequency signal elimination means and internally reproduced interference signals, a plurality of phase compensation means for compensating phase differences of the internally reproduced interference radio frequency signals based on the phase difference detected by the phase difference detection means, which are placed corresponding to a plurality of input signals supplied to the interference radio wave elimination means, a selection means for selecting the plurality of phase difference compensation means, and control means for controlling the operation of the selection means in order to eliminate the interference radio frequency signals from the time slotted signals.

In accordance with another preferred embodiment of the present invention, the interference radio wave elimination device further comprises: a phase difference detection means for detecting phase differences between the interference radio frequency signals included in the input signals which are provided to the interference radio frequency signal elimination means and internally reproduced interference signals, and a phase compensation means for compensating the phase differences of the internally reproduced interference radio frequency signals based on the phase difference detected by the phase difference detection means.

In accordance with another preferred embodiment of the present invention, the interference radio wave elimination method eliminates interference radio frequency signals from input signals including desired radio frequency signals modulated into a digital form and interference radio frequency signals which interferences the desired radio frequency signals. The interference radio wave elimination method comprises: a step of choosing interference radio frequency signals from the input signals, a step of demodulating the interference radio frequency signals chosen by the interference radio frequency choosing step in a digital form, a step of modulating internal transmission waves in a digital form based on interference information obtained by the demodulation process executed by the digital demodulation step, and a step of eliminating the interference radio frequency signals from the input signals by using internally reproduced interference radio frequency signals modulated by the digital modulation step.

BRIEF DESCRIPTION OF THE DRAWINGS

These and other objects, features, aspects and advantages of the present invention will become more apparent from the following detailed description of the present invention when taken in conjunction with the accompanying drawings.

DESCRIPTION OF THE PREFERRED EMBODIMENTS

Other features of the present invention will become apparent through the following description of preferred embodiments which are given for illustration of the present invention and are not intended to be limiting thereof. Preferred embodiments of interference radio wave elimination devices according to the present invention will now be described with reference to the drawings.

Embodiment 1

Figure 1:
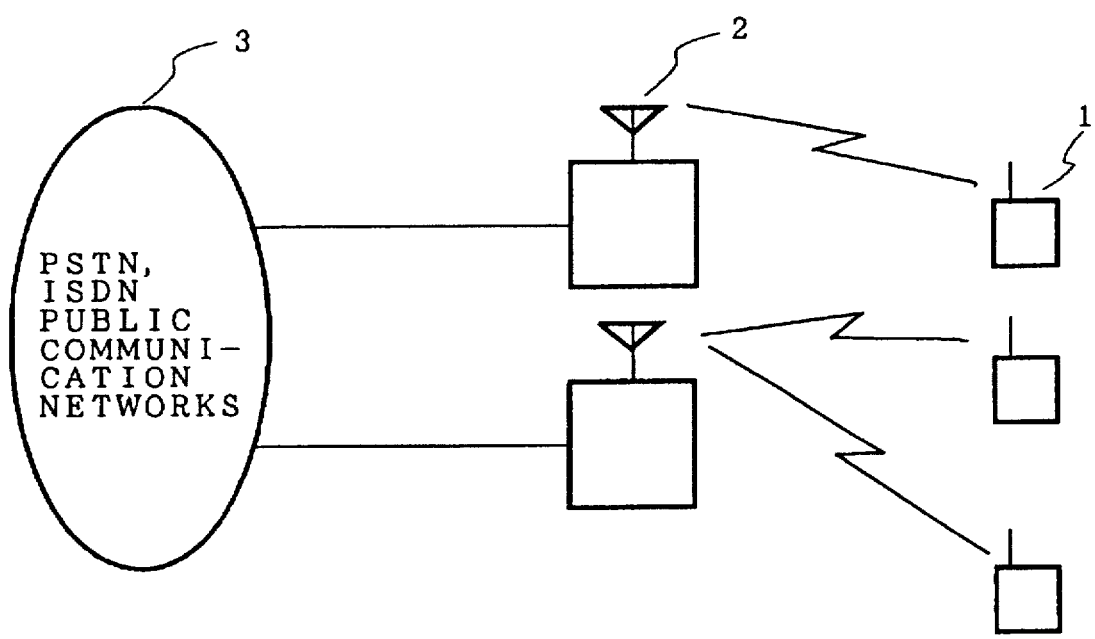
FIG. 1 is a diagram showing an entire system configuration of a mobile radio communication system in which interference radio wave elimination devices of preferred embodiments according to the present invention are used.

FIG. 1 is a diagram showing an entire system configuration of a mobile radio communication system in which interference radio wave elimination devices of preferred embodiments according to the present invention, which will be described below, are used.

In FIG. 1, the mobile radio communication system comprises mobile stations 1 as mobile units such as vehicle communication units and small, hand-held, pocketable communication units (hereinafter referred to as "vehicle communication units" and "pocketable communication units", respectively), base stations 2 that communicate these mobile stations through radio communication channels, and public communication networks 3 such as PSTN (public switch telephone network) and ISDN (integrated service digital network) connected to the base stations 2.

Between the mobile stations 1 and the base stations 2, communication signals are transferred based on the digital modulation method such as FSK, BPSK, QPSK, π/4 QDPSK, QAMSK, QGMSK and the like through radio communication network using methods such as FDMA (frequency division multiple access), Multi-carriers TDMA (time division multiple access), FDMA/TDMA, or FDD/TDD methods.

Figure 2:
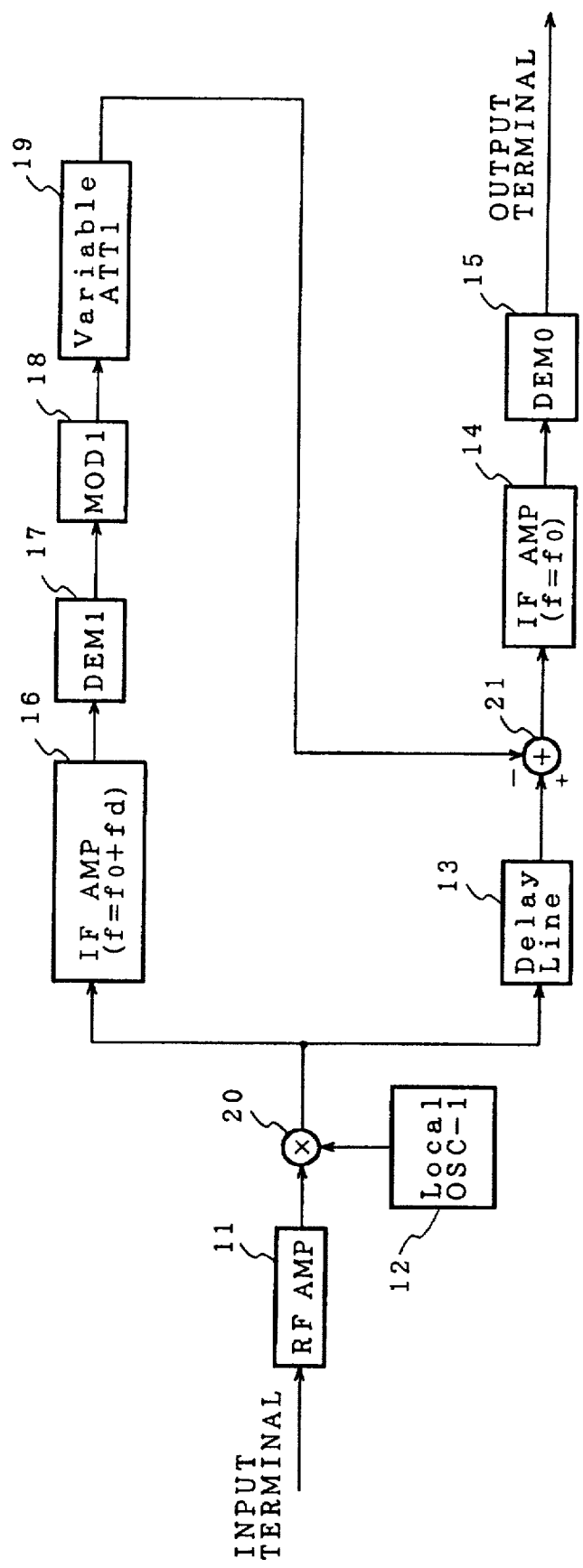
FIG. 2 is a block diagram showing a configuration of the interference radio wave elimination device of the first embodiment according to the present invention.

FIG. 2 is a block diagram showing a configuration of the interference radio wave elimination device of the first embodiment according to the present invention. The interference radio wave elimination device is incorporated in a receiver in each of the mobile stations and the base stations in the mobile radio communication system shown in FIG. 1. In FIG. 2, reference number 11 designates a RF (radio frequency) amplifier for amplifying the level of a radio frequency signal received through an input terminal to a desired level. 12 denotes a local oscillator. 20 indicates multiplier for mixing the radio frequency signal with the locally oscillated signal and for converting the radio frequency signal to an intermediate frequency (IF) signal. Here, the IF signal has the intermediate frequency component "$f_0$" of a desired radio frequency signal (or "desired frequency signal" for brevity) and the intermediate component "$f_0+f_d$" of adjacent channel frequency signal that operates as interference frequency signal to the desired frequency signal. Reference number 16 designates an IF amplifier for the adjacent channel for amplifying only the frequency signal component "$f_0+f_d$" for the adjacent channel. Reference number 17 denotes a digital demodulator for the adjacent channel for demodulating the signal from the IFA 16 and for generating and providing the adjacent channel digital information. Reference number 18 indicates a digital modulator for the adjacent channel for modulating the digital information from the digital demodulator 17. Reference number 19 designates a variable attenuator for attenuating the modulated adjacent channel frequency signal modulated by the digital modulator 18 and for converting the level of the modulated adjacent channel frequency signal to the level that is equal to the level of the adjacent channel frequency signal in output signal from the multiplier 20.

Reference number 13 denotes a delay circuit (delay line) for receiving the IF signal from the multiplier 20 and for delaying the IF signal by a desired time period. Reference number 21 designates an adder for adding the signal inverted from the output signal from the variable attenuator 19 with the output signal from the delay circuit (delay lien) 13 of the desired frequency signal. This adder 21 operates as an interference frequency signal elimination means. Reference number 14 designates a desired frequency signal amplifier as a filter for transmitting only the desired frequency signals, 15 denotes a desired frequency signal demodulator for demodulating the output signal from the desired frequency signal amplifier 14 and for generating digital information to outside devices (not shown). Thus, the interference radio wave elimination device comprises the IF amplifier 16, the digital demodulator 17, the digital modulator 18, the variable attenuator 19, the adder 21 and so on.

Next, the operation of the interference radio wave elimination device of the first embodiment shown in FIG. 2 will be explained with reference to FIG. 3 to FIG. 10.

Figure 3:
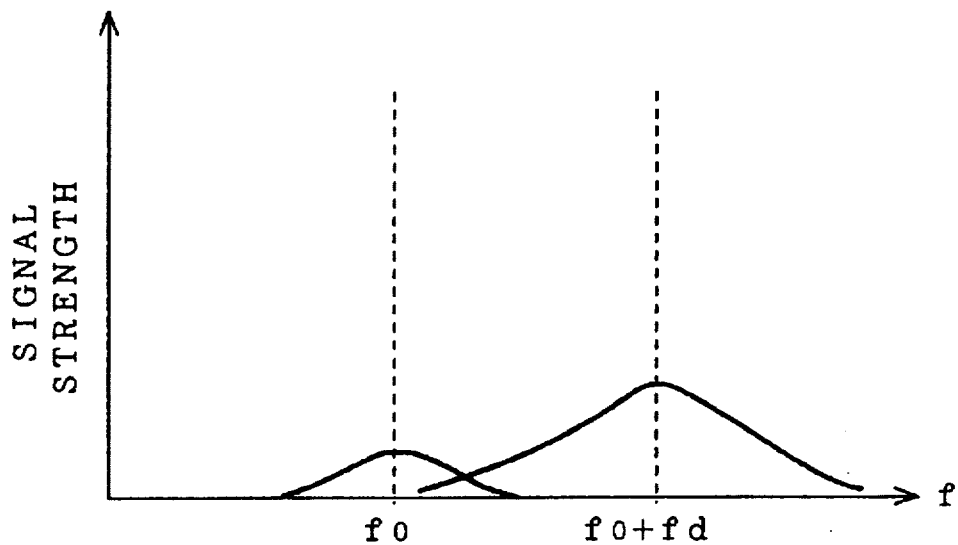
FIG. 3 is a frequency spectrum diagram of an output signal from a multiplier 20 in the interference radio wave elimination device of the first embodiment.
Figure 4:
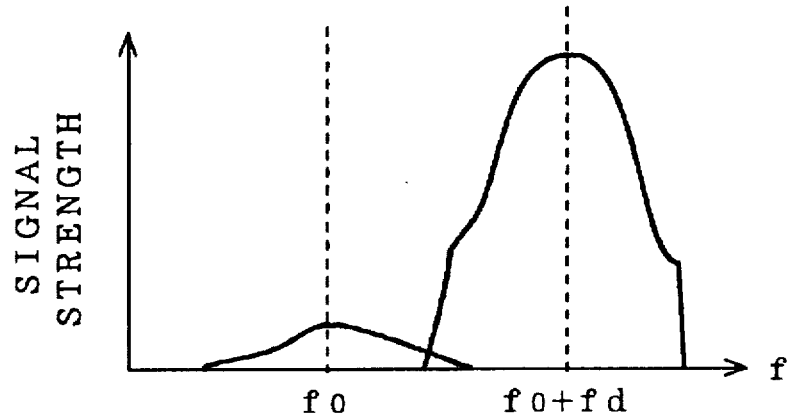
FIG. 4 is a frequency spectrum diagram of an output signal from an amplifier 16 in the interference radio wave elimination device of the first embodiment.
Figure 5:
FIG. 5 is a signal waveform diagram showing an output signal from a demodulator 17 in the interference radio wave elimination device of the first embodiment.
Figure 6:
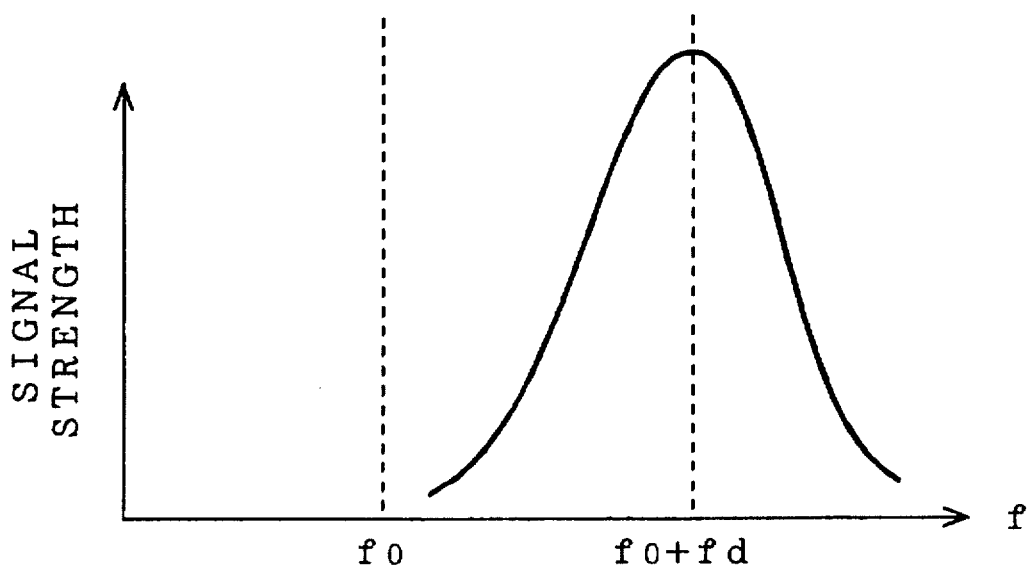
FIG. 6 is a frequency spectrum diagram of an output signal from a modulator 18 in the interference radio wave elimination device of the first embodiment.
Figure 7:
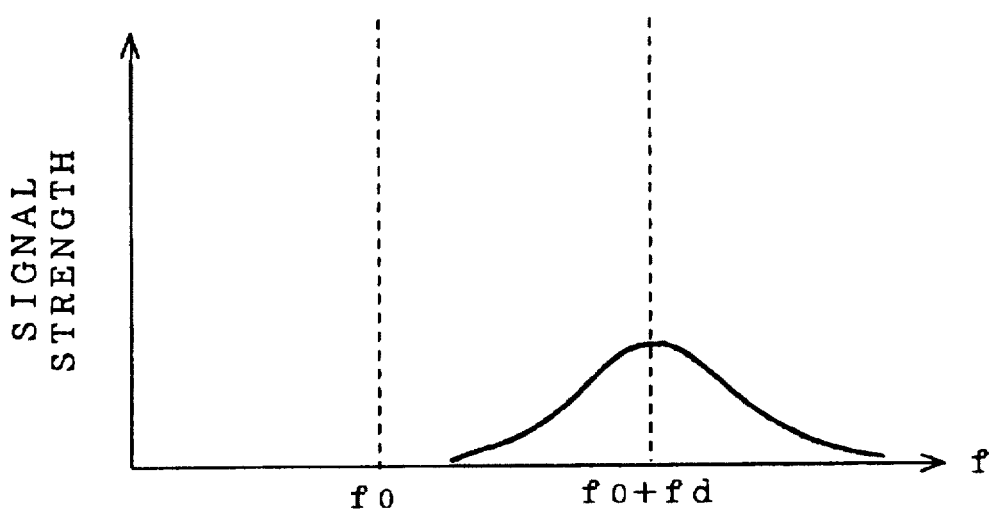
FIG. 7 is a frequency spectrum diagram of an output signal from a variable attenuator 19 in the interference radio wave elimination device of the first embodiment.
Figure 8:
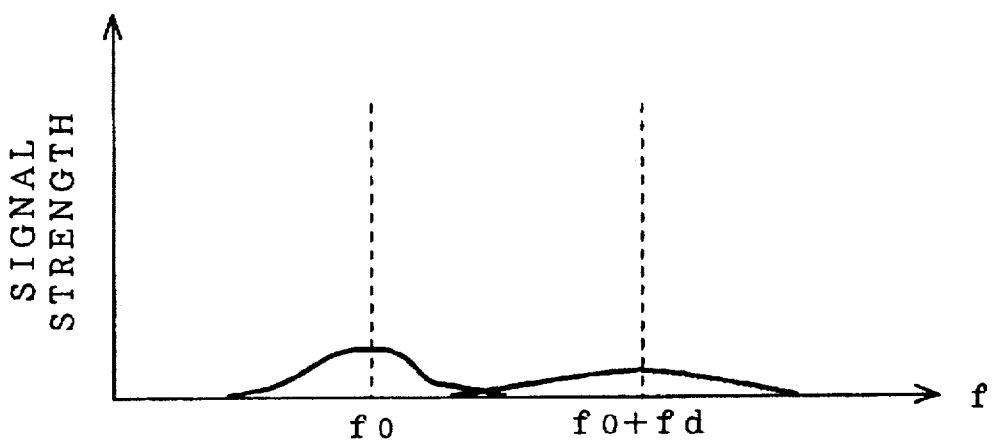
FIG. 8 is a frequency spectrum diagram of an output signal from an adder 21 in the interference radio wave elimination device of the first embodiment.
Figure 9:
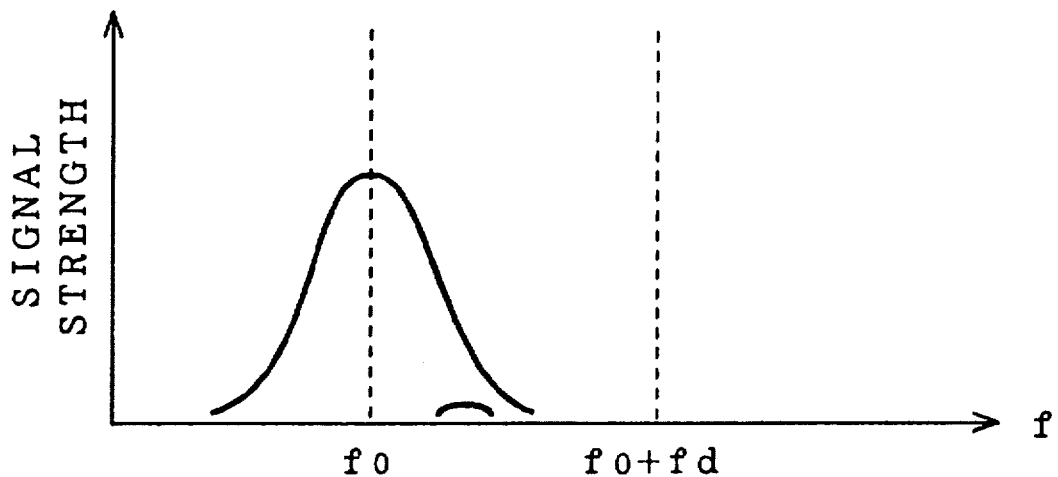
FIG. 9 is frequency spectrum diagram of an output signal from an amplifier 14 in the interference radio wave elimination device of the first embodiment.
Figure 10:
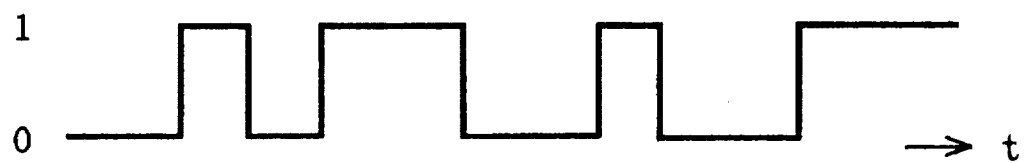
FIG. 10 is a signal waveform diagram showing an output signal from a demodulator 15 in the interference radio wave elimination device of the first embodiment.

FIG. 3 is a frequency spectrum diagram of the output signal from the multiplier 20. FIG. 4 is the frequency spectrum diagram of the output signal from the amplifier 16. FIG. 5 is the signal waveform diagram showing the output signal from the demodulator 17. FIG. 6 is the frequency spectrum diagram of output signal from the modulator 18. FIG. 7 is the frequency spectrum diagram of the output signal from the variable attenuator 19. FIG. 8 is the frequency spectrum diagram of the output signal from the adder 21. FIG. 9 is the frequency spectrum diagram of the output signal from the desired frequency signal amplifier 14. FIG. 10 is the signal waveform diagram showing the output signal from the desired frequency signal demodulator 15. The ordinate in each of FIG. 3 to FIG. 10 indicates Signal strength. The abscissa in each of FIG. 3, FIG. 4, FIG. 6, FIG. 7, FIG. 8, FIG. 9 designates the Frequency. The abscissa in each of FIG. 5 and FIG. 10 shows Time.

The RF amplifier 11 amplifies the radio frequency signals received through the input terminal of the interference radio wave elimination device by a desired amplification rate and outputs the amplified radio frequency signals. The multiplier 20 mixes the locally oscillated frequency signal outputted from the local oscillator 12 and the signals from the RF amplifier 11, and then mixed signals are converted to the IF (intermediate frequency) signal. FIG. 3 shows the frequency spectrum of the output from the multiplier 20. As shown in FIG. 3, IF signal includes the IF signal component $f_0$ and the component $f_0+f_d$ of the adjacent channel frequency signal which is shifted by $f_d$ from the IF signal component $f_0$.

The inter-mediate frequency (IF) signal outputted from the multiplier 20 is inputted to the IF amplifier 16 for the adjacent channel. The IF amplifier 16 amplifies only the frequency component $f_0+f_d$ of the adjacent channel frequency signal, as shown in FIG. 4. The signals outputted from the IF amplifier 16 is demodulated by the digital demodulator 17. Then, the digital demodulator 17 generates the digital signal of the adjacent channel, as shown in FIG. 5. Thus, noises in the signals outputted from the IF amplifier 16 can be eliminated by the demodulator 17.

The digital information as the digital signals from the demodulator 17 is modulated by the digital modulator 18. The digital modulator 18 generates the modulated adjacent channel frequency signal, as shown in FIG. 6. This modulated adjacent channel frequency signal has only signal component of the adjacent channel frequency component $f_0+f_d$, it has no desired frequency signal component $f_0$.

The adjacent channel frequency signal modulated by the digital modulator 18 is attenuated, as shown in FIG. 7, by the variable attenuator 19 and the signal level of the adjacent channel frequency signal is then converted to the level that is equal to the signal level of the adjacent frequency signal provided from the multiplier 20.

As described above, the IF signal outputted from the multiplier 20 is provided to both the IF amplifier 16 and the delay circuit 13. In the delay circuit (delay line) 13, the IF signal is delayed by a desired time period. The adder 21 adds the inverted output signal from the variable attenuator 19 used for the adjacent channel frequency signal and the output signal from the delay circuit 13. The output frequency signal from the adder 21 includes no adjacent channel frequency signal component, as shown in FIG. 8.

The output signal from the adder 21 is inputted to the desired frequency signal amplifier 14. The components other than the desired frequency signal component are eliminated by the desired frequency signal amplifier 14. FIG. 9 shows the frequency spectrum of the output signal from the desired frequency signal amplifier 14. The output frequency signal from the amplifier 14 has only the desired frequency signal component $f_0$, as clearly shown in FIG. 9.

The output signal from the desired frequency signal amplifier 14 is demodulated by the desired frequency signal demodulator 15 in order to generate the digital information as the desired frequency signal, as shown in FIG. 10.

As described above, the interference wave elimination device of the first embodiment shown in FIG. 2 receives input signals including desired frequency signals and interference frequency signals to interfere the desired frequency signal, both have been digitally demodulated, and eliminates the interference frequency signals from the input signals. The interference wave elimination device comprises the interference radio frequency signal choosing means, for choosing the interference frequency signals in the input signals, the digital demodulation means for demodulating the interference frequency signals chosen by the interference radio frequency signal choosing means, the digital modulation means for digitally modulating internal carrier based on the interference frequency information demodulated by the digital demodulation means, and the interference radio frequency signal elimination means for eliminating the interference frequency signals from the input signal by using the internally reproduced interference frequency signals.

Accordingly, even if interference frequency signals generated by adjacent channels are included in the input signals, the interference radio wave elimination device of the present invention can prevent a receiver from interference of radio communication caused by the interference frequency signals, namely interference waves transmitted from adjacent channels, and this device can keep to receive desired frequency signals in an allocated channel good condition in radio communication.

Furthermore, since the interference radio wave elimination device according to the present invention has the delay circuit to delay the input signal in time and to provide the delayed input signal to the interference radio frequency signal elimination means, phase difference between the input signals and the internally reproduced interference frequency signals can be adjusted, so that the device can accurately eliminate the interference frequency signals from the input signal.

Moreover, since the interference radio wave elimination device of the present invention has adjust means for adjusting the level of the interference frequency signals provided from the digital demodulation means, the level of the internally reproduced interference frequency signal can be adjusted into desired value, of which the level is equal to the level of the interference frequency signal in the input signals, so that the device can accurately eliminate the interference frequency signals from the input signal.

Embodiment 2

A canceler used in the device of the first embodiment is incorporated for both adjacent channels relating to the desired channel to be used in the interference radio wave elimination device according to the second embodiment. Here, the technical term "canceler" is introduced through the specification of the present invention, which mainly comprises the multiplier (reference number 20), the digital demodulator (reference number 16), the digital modulator (18), the variable attenuator 19, and the adder. That is, the device of the second embodiment can be applied when there are interference frequencies in both frequency sides of the desired frequency as the desired channel. Since the reference numbers 11 to 20 indicates the same components used in the interference radio wave elimination device according to the first embodiment, the explanation for them are therefore omitted here for brevity.

Figure 11:
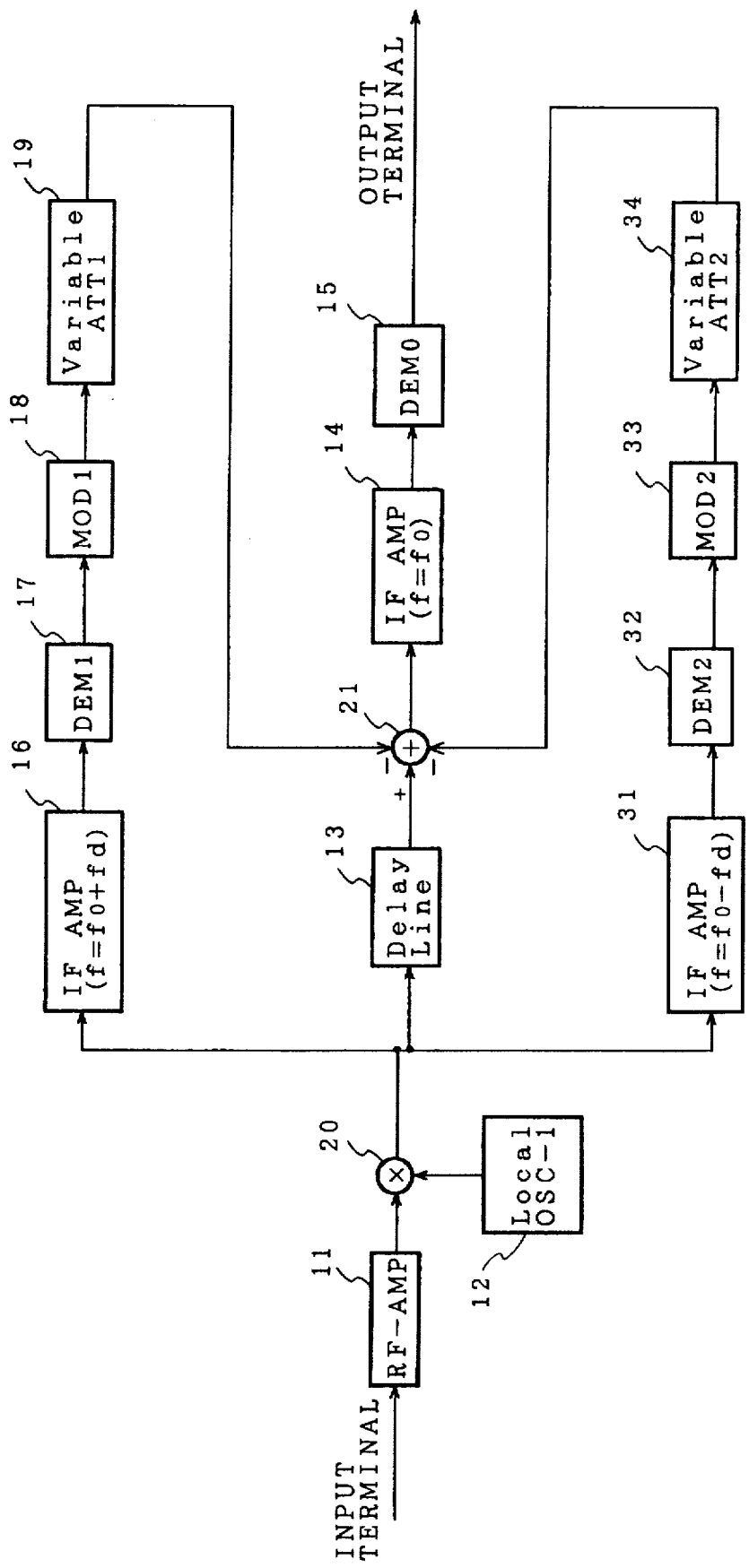
FIG. 11 is a block diagram showing a configuration of the interference radio wave elimination device of the second embodiment according to the present invention.

FIG. 11 is a block diagram showing a configuration of the interference radio wave elimination device of the second embodiment according to the present invention. In FIG.11, reference number 31 designates an IF (intermediate frequency) amplifier for adjacent channel for receiving the IF signal from the multiplier 20 and for amplifying only the frequency signal component $f_0 - f_d$ of the adjacent channel. Reference number 32 denotes a digital demodulator for the adjacent channel for demodulating the signals transmitted from the IF amplifier 31 and for generating adjacent channel digital information. 33 indicates a digital modulator for the adjacent channel for reproducing the adjacent channel modulated signals. Reference number 34 designates a variable attenuator for attenuating the adjacent channel modulated signal and for converting its signal level to the level of adjacent channel frequency signal as the output signal from the multiplier 20. Reference number 21 denotes an adder for adding the inverted output signals from the variable attenuators 19 and 34 used for the both adjacent channel frequency signals and the output signal from the delay circuit 13.

Next, the operation of the interference radio wave elimination device of the second embodiment shown in FIG. 11 will now be explained.

Radio frequency signals received through the input terminal are amplified by the RF amplifier 11 with a desired amplification rate. The multiplier 20 mixes the locally oscillated frequency signal from the local oscillator 12 and the amplified signals from the RF amplifier 11, and converts the mixed signals to the IF (intermediate frequency) signal. The IF signal includes the IF desired signal component $f_0$, the component $f_0 + f_d$ of the adjacent channel frequency signal which is shifted by $f_d$ from the IF signal component $f_0$, and the component $f_0 - f_d$ of the adjacent channel frequency signal which is shifted by $f_d$ from the IF signal component $f_0$.

Because the operations of the amplifier 16, the demodulator 17, the modulator 18, and the variable attenuator 19 are same as those of the device according to the first embodiment, therefore only the operations of the amplifier 31, the demodulator 32, the modulator 33, and the variable attenuator 34 will now be explained here.

The IF signal from the multiplier 20 is inputted to the IF signal amplifier 31 for the adjacent channel. The IF signal amplifier 31 amplifies only the signal component $f_0 - f_d$ of the adjacent channel frequency signal. The signal form the amplifier 31 is demodulated by the digital demodulator 32 and provided as the adjacent channel digital information. By using the digital demodulator 32, noise compensates included in the digital signal inputted from the IF amplifier 31 can be eliminated.

The digital information from the demodulator 32 is modulated by the digital modulator 33 to generate the adjacent channel modulated digital signal which has only adjacent channel modulated digital signal component $f_0 - f_d$, no desired frequency signal component $f_0$. The adjacent channel digital modulated signal from the digital modulator 33 is attenuated and the level of the attenuated digital signal is converted into the level of the adjacent channel digital signal from the multiplier 20 by the variable attenuator 34.

The IF signal from the multiplier 20, as described above, is provided to both the amplifiers 16 and 31, also supplied to the delay circuit (delay line) 13 to delay it by a desired time period. The adder 21 adds the inverted output signals from the variable attenuators 19 and 34 used for the both adjacent channel frequency signals and the output signal from the delay circuit 13 for the desired frequency. Signal components other than the desired frequency signal component in the output signal from the adder 21 are eliminated by filtering of the desired frequency digital amplifier 14. The output signal from the desired signal amplifier 14 is demodulated by the desired frequency digital demodulator 15 to generate the digital information for the desired channel.

As described above, the interference radio wave elimination device of the second embodiment comprises a pair of stages, each stage comprises the interference frequency choosing means, the digital demodulation means and the digital modulation means. The device can eliminate interference frequency signals of both adjacent channels that are adjacent to the desired channel from input signals Therefore the interference radio wave elimination device of the second embodiment can eliminate interference frequency signals from input signals even if the input signals include the interference frequency signals of both adjacent channels.

Embodiment 3

Figure 12:
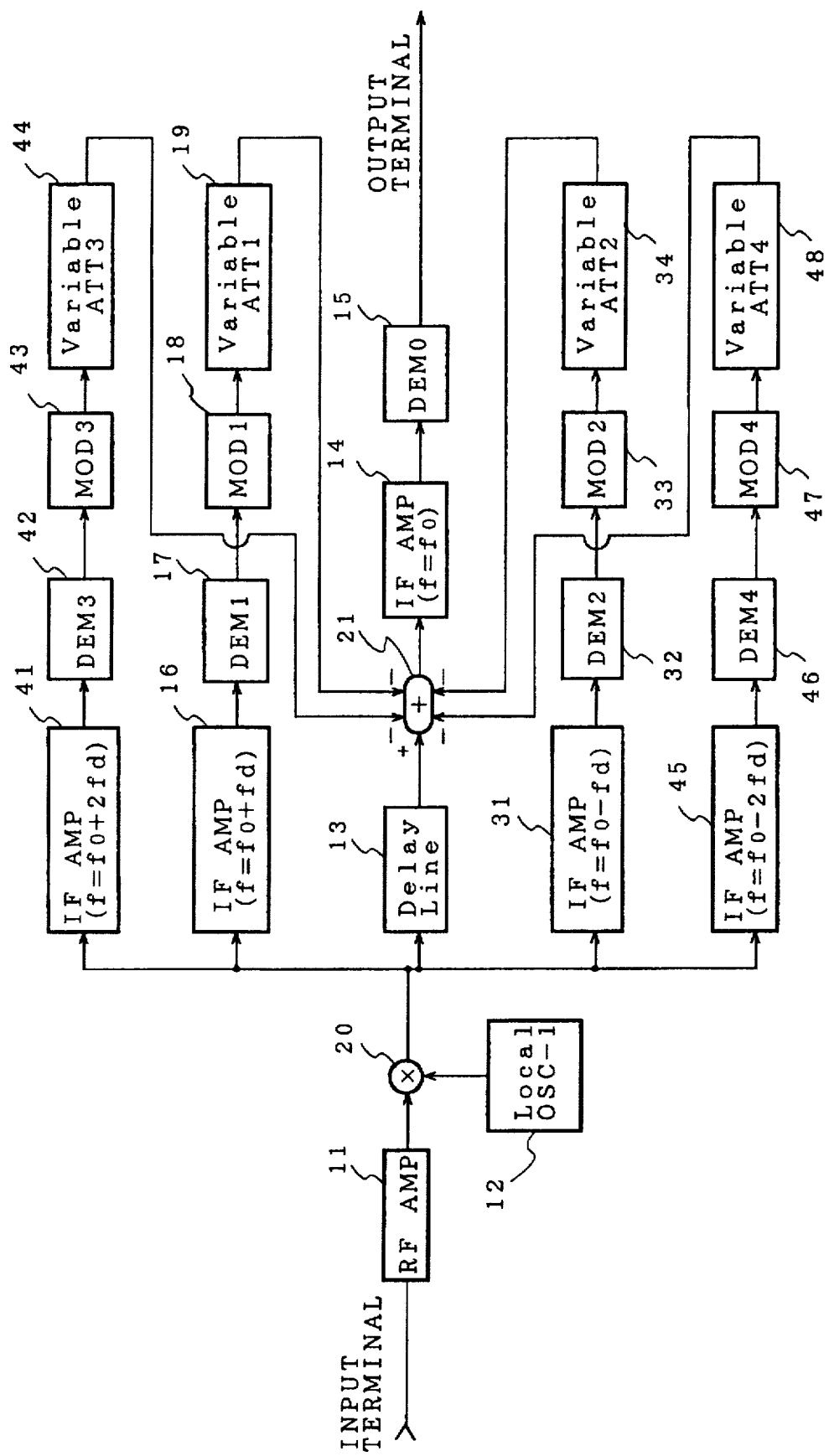
FIG. 12 is a block diagram showing a configuration of the interference radio wave elimination device of the third embodiment according to the present invention.

FIG. 12 is a block diagram showing a configuration of the interference radio wave elimination device of the third embodiment according to the present invention. In the interference radio wave elimination device of the third embodiment, four cancelers are incorporated for both a pair of primary adjacent channels and a pair of second adjacent channels against the desired channel. Thereby, even if there are interference frequency signals from first and second adjacent channels, the interference radio wave elimination device of the third embodiment can efficiently eliminate them.

In FIG. 12, reference numbers 11 to 20 and 31 to 34 are same components in configuration and operation used in the interference radio wave elimination devices of the first and second embodiments. Therefore explanations for them are omitted.

Reference number 41 designates a second adjacent channel IF amplifier for receiving the IF signal from the multiplier 20 and for amplifying only a second adjacent channel signal component $f_0+2f_d$. Reference number 42 denotes a second adjacent channel digital demodulator for demodulating the signal from the second adjacent channel digital amplifier 41 and for generating second adjacent channel digital information. Reference number 43 indicates a second adjacent channel digital modulator for modulating the digital information from the second adjacent channel digital demodulator 42 and for reproducing the second adjacent channel modulated signal. Reference number 44 designates a second adjacent channel variable attenuator for attenuating the second adjacent channel modulated signal from the modulator 43 and for converting the signal level of the attenuated signal to the level of the second adjacent channel signal from the multiplier 2C.

Reference 45 designates a second adjacent channel IF amplifier for receiving the IF signal from the multiplier 20 and for amplifying only a second adjacent channel signal component $f_0-2f_d$. Reference number 46 denotes a second adjacent channel digital demodulator for demodulating the signal from the second adjacent channel digital amplifier 45 and for generating second adjacent channel digital information. Reference number 47 indicates a second adjacent channel digital modulator for modulating the digital information from the second adjacent channel digital demodulator 46 and for reproducing the second adjacent channel modulated signal. Reference number 48 designates a second adjacent channel variable attenuator for attenuating the second adjacent channel modulated signal from the modulator 47 and for converting the signal level of the attenuated signal to the level of the second adjacent channel signal from the multiplier 20. Reference number 21 designates an adder for adding the inverted output signals from the variable attenuators 19, 34, 44, and 48 and the output signal from the delay circuit (delay line) 13 for the desired frequency.

Next, the operation of the interference radio wave elimination device of the third embodiment will now be explained. Radio frequency signals received through the input terminal (not shown) are amplified by the RF amplifier 11 with a desired amplification rate. The multiplier 20 mixes the locally oscillated frequency signal from the local oscillator 12 and the amplified signals from the RF amplifier 11, and converts the mixed signals to the IF signal. The IF signal includes the IF desired signal component $f_0$, the components $f_0+f_d$ and $f_0-f_d$ of the adjacent channel frequency signal which are shifted by $\pm f_d$ from the IF signal component $f_0$, respectively, and the components $f_0+2f_d$ and $f_0-2f_d$ of the second adjacent channel frequency signal which are shifted by $\pm 2f_d$ from the IF signal component $f_0$, respectively.

The operations of the amplifiers 16 and 31, the demodulators 17 and 32, the modulators 18 and 33, the variable attenuators 19 and 34 are same as those of the interference radio wave elimination device of the second embodiment.

The IF signal from the multiplier 20 is transmitted to the second adjacent channel IF signal amplifier 41. The IF signal amplifier 41 amplifies only the signal component $f_0+2f_d$ of the second adjacent channel frequency signal. The signal form the amplifier 41 is demodulated by the digital demodulator 42 and provided as the second adjacent channel digital information. By using the second adjacent channel digital demodulator 42, noise components included in the digital signal outputted from the IF amplifier 41 can be eliminated.

The digital information from the demodulator 42 is modulated by the digital modulator 43 to generate the second adjacent digital modulated signal which has only modulated second adjacent digital channel signal component $f_0+2f_d$, no desired frequency signal component $f_0$. The second adjacent channel demodulated digital signal from the digital modulator 43 is attenuated and the level of the attenuated digital signal is converted into the level of the second adjacent channel digital signal from the multiplier 20 by the variable attenuator 44.

On the other hand, the IF signal from the multiplier 20 is inputted to the second adjacent channel IF signal amplifier 45. The IF signal amplifier 45 amplifies only the signal component $f_0-2f_d$ of the second adjacent channel frequency signal. The signal form the amplifier 45 is demodulated by the digital demodulator 46 and provided as the second adjacent channel digital information. By using the second adjacent channel digital demodulator 46, noise components included in the digital signal outputted from the IF amplifier 45 can be eliminated.

The digital information from the demodulator 46 is modulated by the digital modulator 47 to generate the second adjacent channel digital modulated signal which has only modulated second adjacent channel digital signal component $f_0-2f_d$, no desired frequency signal component $f_0$. The second adjacent channel digital modulated signal from the digital modulator 47 is attenuated and the level of the attenuated digital signal is converted into the level of the second adjacent channel digital signal from the multiplier 20 by the variable attenuator 48.

The IF signal from the multiplier 20 is provided to both the amplifiers 16, 31, 41, and 45, also supplied to the delay circuit 13 to delay it by a desired time period. The adder 21 adds the inverted output signals from the variable attenuators 19, 34, 44, and 48 used for the first and secondly adjacent channel frequency signals and the output signal from the delay circuit 13 for the desired frequency. Signal components other than the desired frequency signal component in the output signal from the adder 21 are eliminated by filtering of the desired frequency digital amplifier 14. The output signal from the desired signal amplifier 14 has only the frequency component $f_0$ of the desired frequency signal. The output signal from the desired signal amplifier 14 is demodulated by the desired frequency digital demodulator 15 to generate the digital information for the desired channel.

As described above, since the interference radio wave elimination device of the third embodiment comprises two pairs of stages, each stage comprises the interference frequency choosing means, the digital demodulation means and the digital modulation means. The interference radio wave elimination device of the third embodiment can eliminate interference frequency signals of both first and secondly adjacent channels adjacent to the desired channel from input signals. Therefore the interference radio wave elimination device of the third embodiment eliminates interference frequency signals from input signals even if the input signals include the interference frequency signals of both first and second adjacent channels.

Embodiment 4

Figure 13:
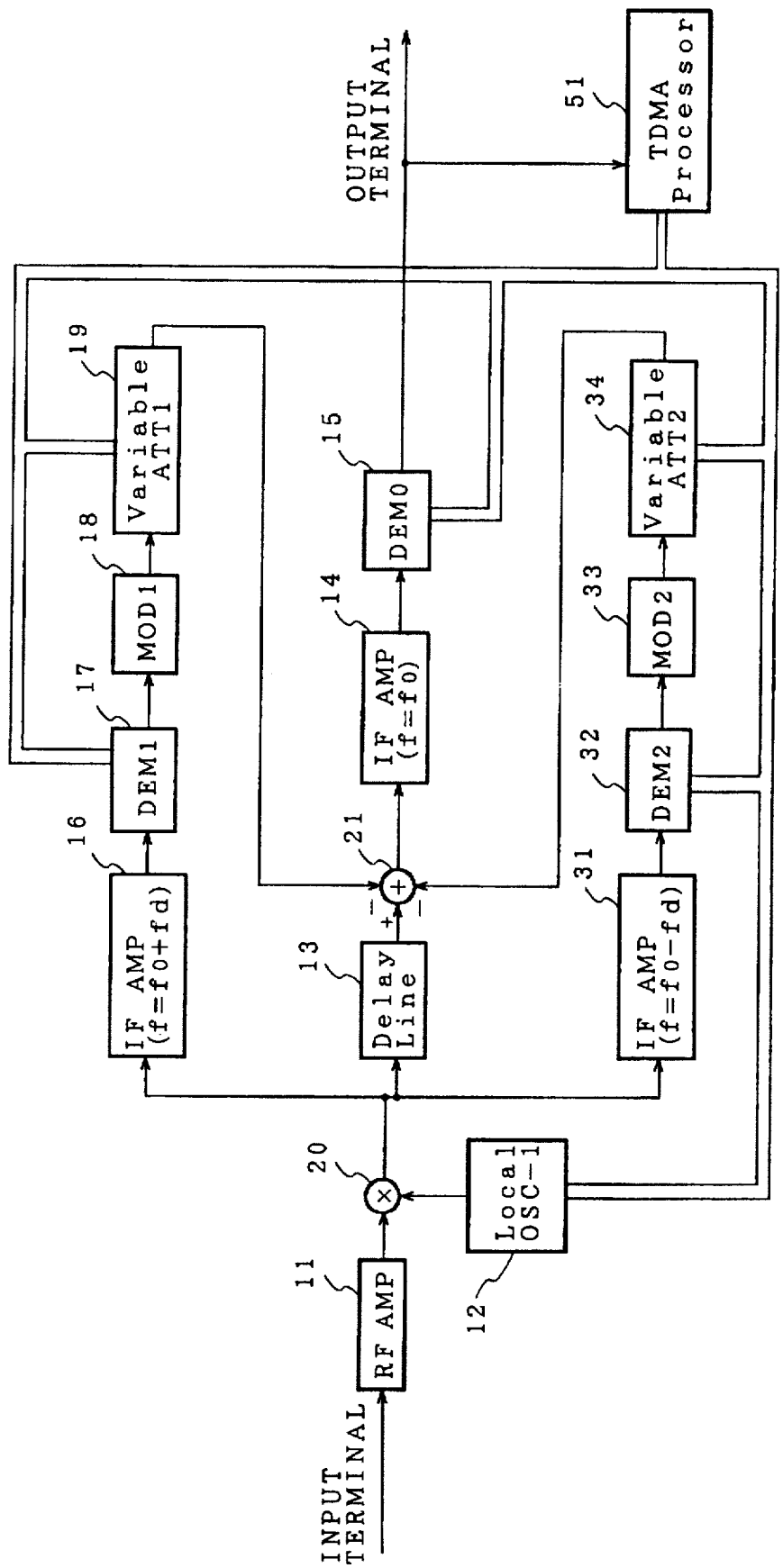
FIG. 13 is a block diagram showing a configuration of the interference radio wave elimination device of the fourth embodiment according to the present invention.
Figure 14A:
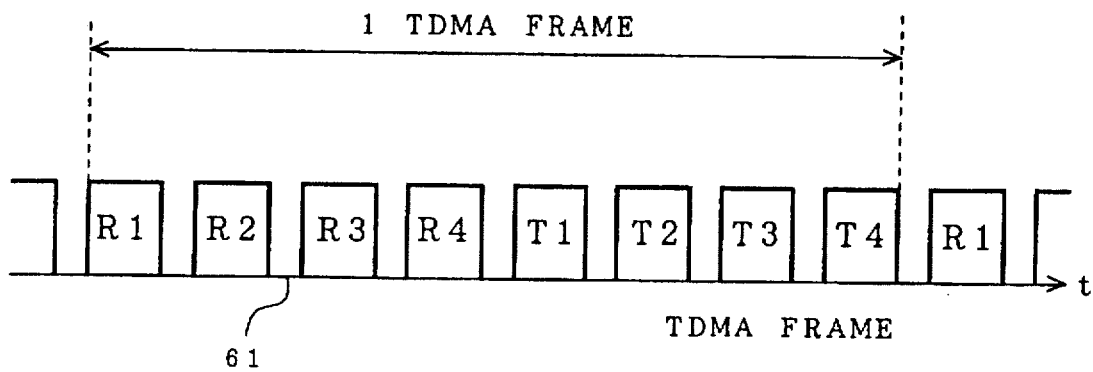
FIGS. 14A to 14D are diagrams showing TDMA frame formats applied to the interference radio wave elimination device of the fourth embodiment shown in FIG. 13.
Figure 14B:
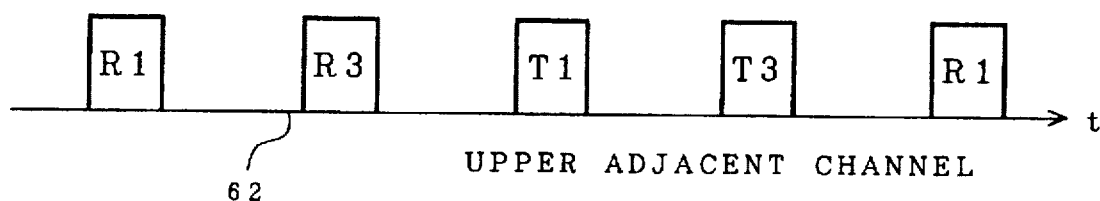
Figure 14C:
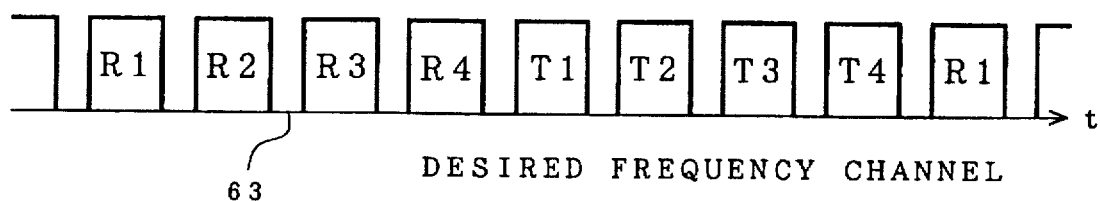
Figure 14D:
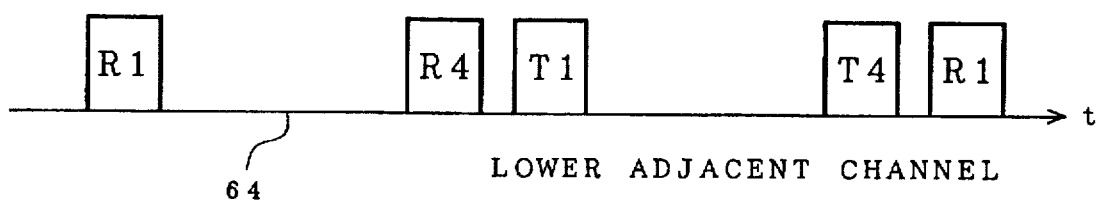

FIG. 13 is a block diagram showing the configuration of the interference radio wave elimination device of the fourth embodiment according to the present invention. FIGS. 14A to 14D are diagrams showing TDMA frame formats applied to the interference radio wave elimination device of the fourth embodiment shown in FIG. 13.

The interference radio wave elimination device of the fourth embodiment basically has the same configuration of the interference radio wave elimination device of the second embodiment. That is, in the interference radio wave elimination device of the fourth embodiment, a pair of the interference radio wave elimination devices are incorporated for both adjacent channels of the desired channel and applied to digital signals of a TDM (Time division multiple) system. The components designated by reference numbers 11 to 21 and 31 to 34 are same elements used in the interference radio wave elimination device of the second embodiment. Therefore the explanation of those are omitted here for brevity. Reference number 51 designates a TDMA (Time division multiple access) processor.

In FIGS. 14A to 14D, reference number 61 designates a frame configuration used in the TDM system. Reference number 62 designates an upper adjacent channel TDM frame format, 63 denotes the desired channel TDM frame format, and 64 indicates the lower adjacent channel TDM frame format.

Each of reference characters R1, R2, R3, R4, T1, T2, T3, and T4 designates each time slot.

In the interference radio wave elimination device of the fourth embodiment, as shown in FIGS. 14A to 14D, TDMA frame is 4 channel TDD (time domain duplex). Therefore the first slot 62-R1 and the third slot 62-R3 in the upper adjacent channel become interference slots against the desired channel. In addition, the first slot 64-R1 and the fourth slot 64-R4 in the lower adjacent channel become interference slots against the desired channel. The first slot 62-R1 in the adjacent upper channel and the first 64-R1 slot in the lower adjacent channel become interference frequency waves of both adjacent channels to the desired channel.

Next, the operation of the interference radio wave elimination device of the fourth embodiment will now be explained.

Radio frequency signals received through the input terminal are amplified by the RF amplifier 11 with a desired amplification rate. The multiplier 20 mixes the locally oscillated frequency signal from the local oscillator 12 and the amplified signals from the RF amplifier 11, and converts the mixed signals to the IF signal.

When the time slot R1 in the TDMA frame 62 is received, the IF signal includes the IF signal $f_0$ of the desired frequency signal and frequency components $f_0+f_d$ and $f_0-f_d$ of the adjacent channel frequency signal which are shifted by $\pm f_d$ from the IF signal component $f_0$, respectively. First of all, the digital amplifier 16, the digital demodulator 17, the digital modulator 18, the variable attenuator 19 and the like will not be explained.

The IF signal from the multiplier 20 is provided to the IF amplifiers 16 for the adjacent channel. The IF amplifier 16 amplifies only a the frequency component $f_0+f_d$ of the adjacent channel frequency signal. The output signal from the IF amplifier 16 is demodulated by the digital demodulator 17. Then, the digital demodulator 17 generates the digital signal as th e digital information for the adjacent channel. Thus, noises in the output signal transmitted from the IF amplifier 16 can be eliminated by the demodulator 17. The digital information as the digital signals from the digital demodulator 17 is modulated by the digital modulator 18. The digital modulator 18 generates the modulated adjacent channel frequency signal. This modulated adjacent channel frequency signal has only signal component of the adjacent channel frequency component $f_0+f_d$, it has no desired frequency signal component $f_0$.

The adjacent channel frequency signal modulated by the digital modulator 18 is attenuated by the variable attenuator 19 and the signal level of the adjacent channel frequency signal is then converted to the level that is same as that of the adjacent frequency signal provided from the multiplier 20.

Next, the operations of the digital amplifier 31, the digital demodulator 32, the digital modulator 33, the variable attenuator 34 and the like will now be explained.

The IF signal from the multiplier 20 is inputted to the IF signal amplifier 31 for the adjacent channel. The IF signal amplifier 31 amplifies only the signal component $f_0-f_d$ of the adjacent channel frequency signal. The signal from the amplifier 31 is demodulated by the digital demodulator 32 and provided as the adjacent channel digital information. By using the digital demodulator 32, noise components included in the digital signal outputted from the IF amplifier 31 can be eliminated.

The digital information from the demodulator 32 is modulated by the digital modulator 33 to regenerate the adjacent channel digital modulated signal which has only adjacent channel digital modulated signal component $f_0-f_d$, no desired frequency signal component $f_0$. The adjacent channel demodulated digital signal from the digital modulator 33 is attenuated and the level of the attenuated digital signal is converted into the level of the adjacent channel digital signal from the multiplier 20 by the variable attenuator 34.

The IF signal from the multiplier 20, as described above, is provided to both the amplifiers 16 and 31, also supplied to the delay circuit (delay line) 13 to delay it by a desired time period. The adder 21 adds the inverted output signals from the variable attenuators 19 and 34 used for the adjacent channel frequency signal and the output signal from the delay circuit (delay line) 13 for the desired frequency. Signal components other than the desired frequency signal component in the output signal from the adder 21 are eliminated by filtering of the desired frequency digital amplifier 14. The output signal from the desired signal amplifier 14 has only the frequency component $f_0$ of the desired frequency signal. This output signal from the amplifier 14 is demodulated by the desired frequency digital demodulator 15 to generate the digital information for the desired channel.

The output signal from the desired frequency digital amplifier 14 is demodulated by the digital demodulator 15 to generate digital information. At the timing of receiving the time slot R2 in the TDMA frame 62, because there is no interference frequency slot in both the upper and the lower channels, the canceler does not operate. In this case, the TDMA processor 51 performs so that the input signal is directly transferred, not added by the adder 21, to the digital amplifier 14.

At the timing of receiving the time slot R3 in the TDMA frame 62, because there is an interference frequency slot only in the upper adjacent channel, not in the lower adjacent channel, the TDMA processor 51 performs so that the canceler will work only for the interference frequency signal of the lower channel. That is, one of the cancelers, which comprises the digital amplifier 16, the digital demodulator 17, the digital modulator 18, and the variable attenuator 19, is only executed. Then, the adder 21 adds the inverted output signal from the variable attenuator 19 used for the frequency signal of the lower adjacent channel and the output signal from the delay circuit 13 (for the desired frequency).

On the other hand, at the timing of receiving the time slot R4 in the TDMA frame 62, because there is an interference frequency slot only in the lower adjacent channel, not in the upper adjacent channel, the TDMA processor 51 performs so that the canceler will work only for the interference frequency signal of the lower channel. That is, one of the cancelers, which comprises the digital amplifier 31, the digital demodulator 32, the digital modulator 33, and the variable attenuator 34, is only executed. Then, the adder 21 adds the inverted output signal from the variable attenuator 34 used for the frequency signal of the lower adjacent channel and the output signal from the delay circuit 13 (for the desired frequency). Then, the interference frequency signal components other than the desired frequency signal component in the output signal from the adder 21 are eliminated by filtering of the desired frequency amplifier 14.

As described above, since the interference radio wave elimination device of the fourth embodiment comprises the control means (the TDMA processor 51) for controlling the elimination operation of the interference frequency signal according to the time slots, the interference radio wave elimination device can efficiently eliminate interference frequency signals from the input signals in cases that the TDMA systems are used and the states of interference frequency signals in time slots are different to each other.

Embodiment 5

In the interference radio wave elimination device of the fifth embodiment according to the present invention, the operation accuracy of the canceler can be increased by synchronizing the phase of a signal obtained by the canceler with the phase of the interference frequency signal in the subtraction operation executed by adder 21.

Figure 15:
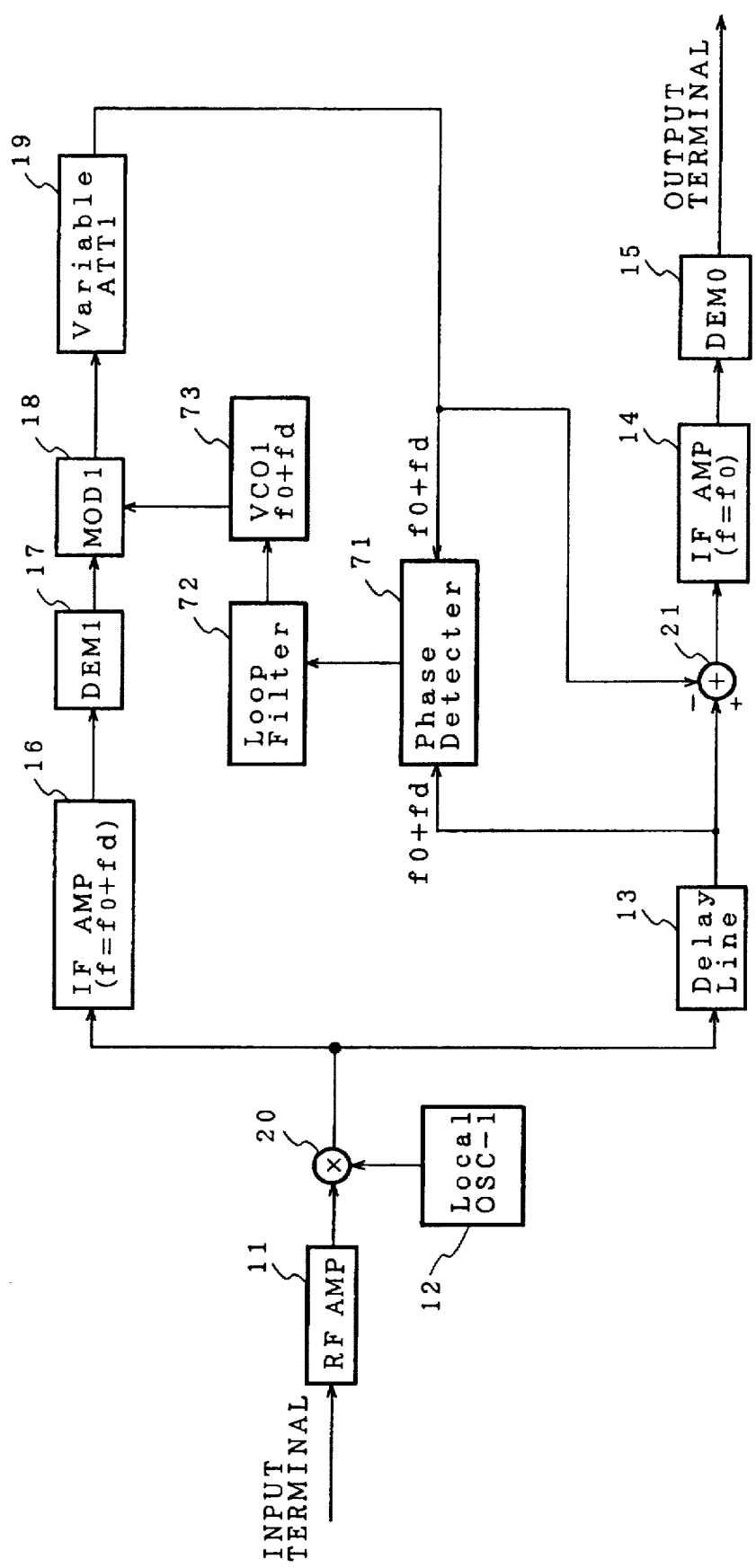
FIG. 15 is a block diagram showing a configuration of the interference radio wave elimination device of the fifth embodiment according to the present invention.

FIG. 15 is a block diagram showing the configuration of the interference radio wave elimination device of the fifth embodiment. In FIG. 15, the components designated by reference numbers 11 to 21 are same elements used in the interference radio wave elimination device of the first embodiment. Therefore the explanation of those are omitted here for brevity. Reference number 71 designates a phase detector, as a phase difference detection means, for detecting the phase difference between the output signal from the variable attenuator 19 and the output signal from the delay circuit (delay line) 13. Reference number 72 indicates a loop filter for receiving the output signal from the phase detector 71 for filtering the received signal, 73 denotes a voltage controlled oscillator (VCO) for receiving the output signal from the loop filter 72 and for providing the signal to the modulator 18.

Next, the operation of the interference radio wave elimination device according to the fifth embodiment will now be explained.

The RF amplifier 11 amplifies the radio frequency signals received through the input terminal of the interference radio wave elimination device by a desired amplification rate and outputs the amplified radio frequency signals. The multiplier 20 mixes the locally oscillated frequency signal from the local oscillator 12 and the signals from the RF amplifier 11, and then mixed signal are converted to the IF (intermediate frequency), signal. IF signal includes the IF signal component $f_0$ and the component $f_0+f_d$ of the adjacent channel frequency signal which is shifted by $f_d$ from the IF signal component $f_0$.

The IF signal from the multiplier 20 is inputted to both the desired frequency signal delay circuit 13 (Delay line) and the IF amplifier 16 for the adjacent channel. The adjacent channel IF amplifier 16 amplifies only the frequency component $f_0+f_d$ of the adjacent channel frequency signal. The output signal from the IF amplifier 16 is demodulated by the digital demodulator 17. Then, the digital demodulator 17 generates the digital signal of the adjacent channel. Noises in the output signal transmitted from the IF amplifier 16 can be eliminated by the demodulator 17.

The digital information as the digital signals from the demodulator 17 is modulated by the digital modulator 18. The digital modulator 18 generates the modulated adjacent channel frequency signal. This modulated adjacent channel frequency signal has only signal component of the adjacent channel frequency component $f_0+f_d$, it has no desired frequency signal component $f_0$. The adjacent channel frequency signal modulated by the digital modulator 18 is attenuated by the variable attenuator 19 and the signal level of the adjacent channel frequency signal is then converted to the level that is same as that of the adjacent frequency signal provided from the multiplier 20.

The adder 21 adds the inverted output signal from the variable attenuator 19 used for the adjacent channel frequency signal and the output signal from the delay circuit 13. The output frequency signal from the adder 21 includes no adjacent channel frequency signal component.

The phase detector 71 receives the output signals from the adder 21 and the delay circuit (delay line) 13 and detects the phase difference between received output signal and generates a phase difference signal indicating the magnitude of the phase difference between them. The loop filter 72 receives the phase difference signal from the phase detector 71 and performs the filtering operation of the phase difference signal and then transmits the result of the filtering operation to the voltage controlled oscillator (VCO) 73. The VCO output signal of the center frequency $f_0+f_d$ is transferred to the digital modulator 18. The digital modulator 18 modulates this VCO output transmission signal based on the digital output signal transmitted from the demodulator 17.

Thus, the closed loop comprising the phase difference detector 71, the loop filter 72, the VCO 73, the modulator 18 and the variable attenuator 19 forms the PLL (Phase locked loop).

The output signal from the adder 21, in which the adjacent channel interference frequency signal has been eliminated, is provided to the desired channel amplifier 14 having the filter to select only the desired channel frequency signal component. Then, the output signal from the amplifier 14 is transmitted to the desired channel demodulator 15 for demodulating the output signal from the amplifier 14.

As described above, because the interference radio wave elimination device of the fifth embodiment comprises the phase detector 71 as the phase difference detection means for detecting the phase difference between the interference frequency signal included in the input signal received through the input terminal and the internally reproduced interference frequency signal, and the phase difference compensation means for compensating the phase difference, the device can compensate the phase difference between interference frequency signal in the input signal and the internally reproduced interference signal as the internally reproduced interference frequency signal, and the device can accurately eliminate the interference frequency signal from the input signal.

Embodiment 6

In the interference radio wave elimination device according to the sixth embodiment, a phase synchronism loop is incorporated, by which interference frequency signals from n-th adjacent channel can be eliminated.

Figure 16:
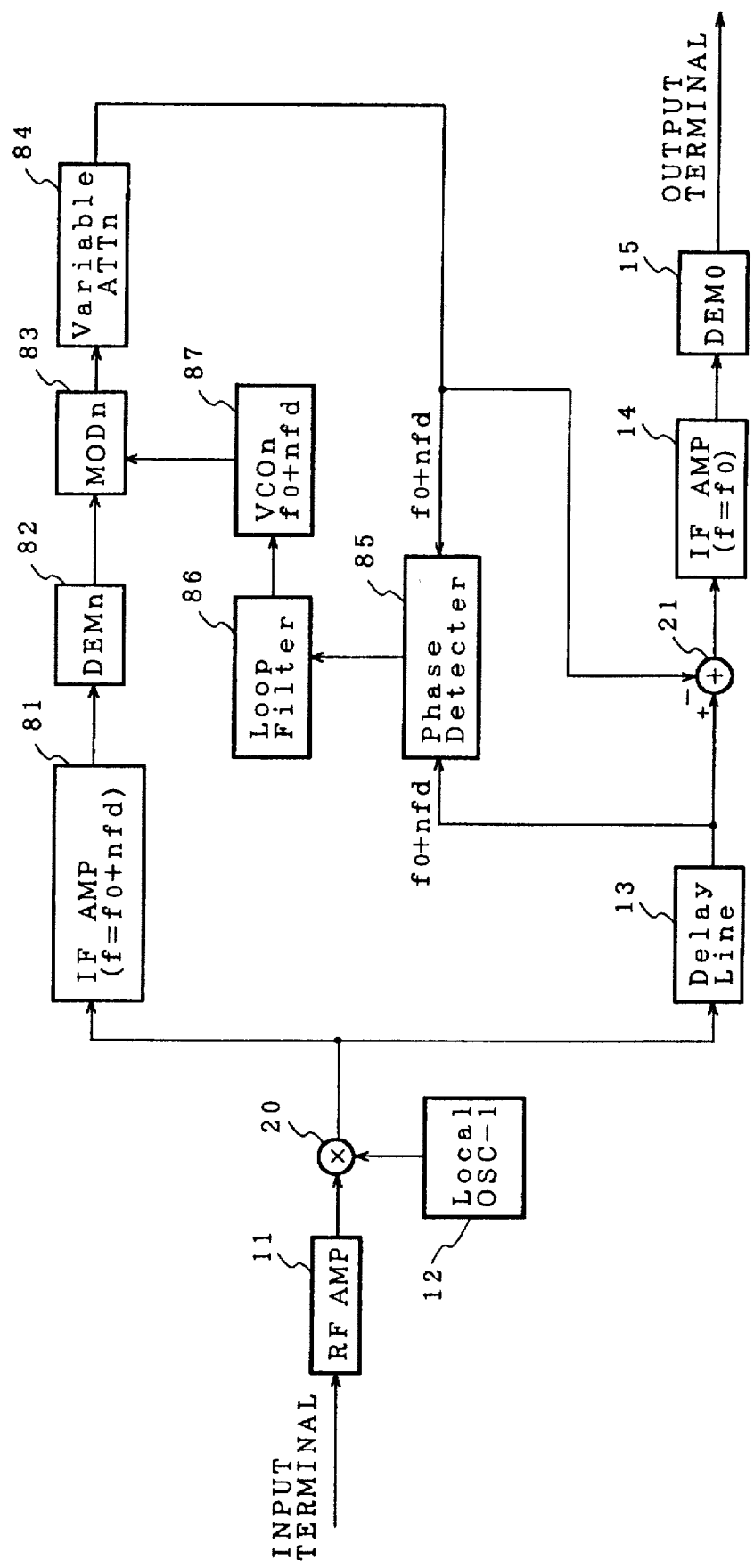
FIG. 16 is a block diagram showing a configuration of the interference radio wave elimination device of the sixth embodiment according to the present invention.

FIG. 16 is a block diagram showing the configuration of the interference radio wave elimination device of the seventh embodiment according to the present invention. In FIG. 16, the components designated by reference numbers 11 to 15, 20, and 21 are same elements used in the interference radio wave elimination device of the first embodiment. Therefore the explanation of those are omitted here for brevity. Reference number 81 designates an IF (intermediate frequency) amplifier for adjacent channels for receiving the IF signal from the multiplier 20 and for amplifying only the frequency signal component $f_0+nf_d$ ("n" is a positive number) of the adjacent channel. Reference number 82 denotes a digital demodulator for the adjacent channels for demodulating the signals outputted from the IF amplifier 81 and for generating adjacent channel digital information, 83 indicates a digital modulator for the adjacent channels for reproducing the adjacent channel demodulated signals. Reference number 84 designates a variable attenuator for attenuating the adjacent channel modulated signal and for converting its signal level to the level of adjacent channel frequency signal as the output signal from the multiplier 20.

Reference number 85 designates a phase detector (a phase difference detection means) for detecting the phase difference between the output signal from the variable attenuator 84 and the output signal from the delay circuit (delay line) 13. Reference number 86 indicates a loop filter for receiving the output signal from the phase detector 85 for filtering the received signal, 87 denotes a voltage controlled oscillator (VCO) for receiving the output signal from the loop filter 86 and for providing the signal to the modulator 83.

Next, the operation of the interference radio wave elimination device according to the sixth embodiment will now be explained.

The RF amplifier 11 amplifies the radio frequency signals received through the input terminal of the interference radio wave elimination device by a desired amplification rate and outputs the amplified radio frequency signals. The multiplier 20 mixes the locally oscillated frequency signal from the local oscillator 12 and the amplified input signals from the RF amplifier 11, and then mixed signals are converted to the IF (intermediate frequency) signal. IF signal includes the IF signal component $f_0$ and the component $f_0+nf_d$ of the adjacent channel frequency signal which is shifted by $nf_d$ from the IF signal component $f_0$.

The IF signal from the multiplier 20 is inputted to both the desired frequency signal delay circuit 13 (Delay line) and the IF amplifier 81 for the adjacent channels. The adjacent channel IF amplifier 81 amplifies only the frequency component $f_0+nf_d$ of the adjacent channel frequency signal. The output signal from the IF amplifier 81 is demodulated by the digital demodulator 82. Then, the digital demodulator 82 generates the digital signal of the adjacent channel. Noises in the output signal transmitted from the IF amplifier 16 can be eliminated by the demodulator 17.

The digital information as the digital signals from the demodulator 82 is modulated by the digital modulator 83. The digital modulator 83 generates the modulated adjacent channel frequency signal. This modulated adjacent channel frequency signal has only signal component of the adjacent channel frequency component $f_0+nf_d$, it has no desired frequency signal component $f_0$. The adjacent channel frequency signal modulated by the digital modulator 83 is attenuated by the variable attenuator 84 and the signal level of the adjacent channel frequency signal is then converted to a required signal level.

The phase detector 85 receives both the output signals from the variable attenuator 84 and the delay circuit 13 for the desired channel, detects the phase difference between them, and generates a phase difference signal. The loop-filter 86 receives this phase difference signal from the phase detector 85, filters it, and transmits the filtered signal to the VCO 87. The digital modulator 83 receives the output signal having the center frequency $f_0+nf_0$ transmitted from the VCO 87, and modulates it based on the output signal from the demodulator 82.

Thus, the PLL (phase locked loop) circuit comprising the phase detector 85, the loop filter 86, the VCO 87, the digital modulator 83, and the variable attenuator 82 can synchronize in phase the n-th adjacent channel transmission frequency wave.

The output signal from the adder 21, which has no adjacent channel frequency signal component, is transmitted to the desired channel amplifier 14. The output signal from the amplifier 14 is demodulated by the demodulator 15 to generate digital information of the desired channel.

As described above, because the interference radio wave elimination device of the sixth embodiment comprises the phase detector as the phase difference detection means for detecting the phase difference between the interference frequency signal included in the input signal received through the input terminal and the internally reproduced interference frequency signal, and the phase difference compensation means for compensating the phase difference, the device can compensate the phase difference between interference frequency signal in the input signal and the internally reproduced elimination signal as the internally reproduced interference frequency signal, and the device can accurately eliminate the interference frequency signal from the input signal. In particular, the interference radio wave elimination device of the sixth embodiment can eliminate the interference frequency signal component of the n-th adjacent channel from the received input signal.

Embodiment 7

The interference radio wave elimination device of the seventh embodiment according to the present invention can be applied to receivers which operate based on the TDMA method for interference frequency signals shown in FIGS. 14A to 14D. In particular, the device of the seventh embodiment can be applied the case that the upper channel time slot R1 and the lower channel time slot R3 are eliminated from an input signal.

Figure 17:
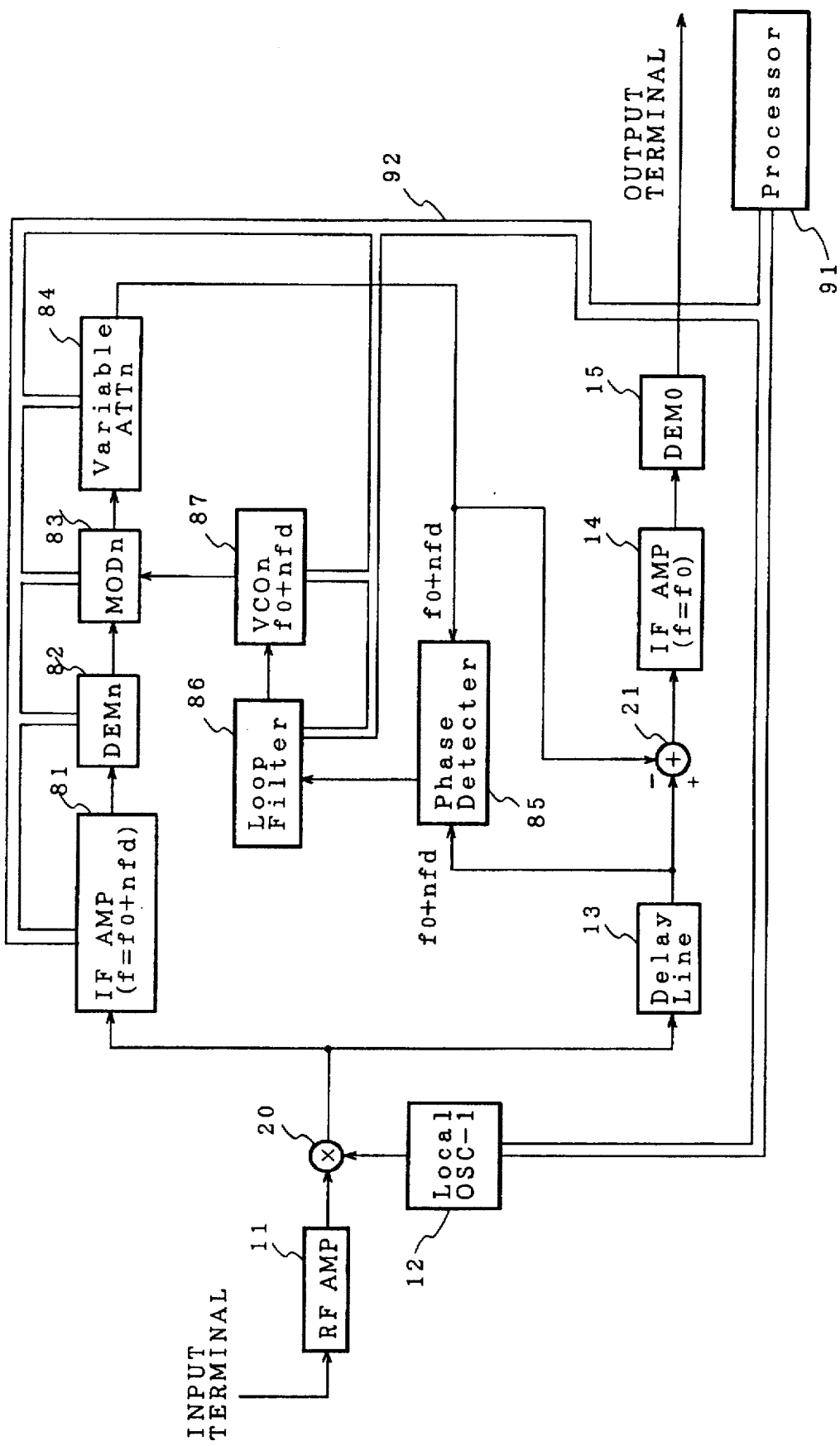
FIG. 17 is a block diagram showing a configuration of the interference radio wave elimination device of the seventh embodiment according to the present invention.

FIG. 17 is a block diagram showing the configuration of the interference radio wave elimination device of the seventh embodiment according to the present invention.

In FIG. 17, the components designated by reference numbers 11 to 15, 20, 21, and 81 to 87 are same elements used in the interference radio wave elimination device of the sixth embodiment. Therefore the explanation of those are omitted here for brevity.

Reference number 91 designates a processor as a control means for controlling the operations of the digital amplifier 81, the digital demodulator 82, the digital modulator 83, the variable attenuator 84, and the oscillator 12 through a bus signal line 92.

Because the transmission frequencies of the time slot R1 of the upper adjacent channel and the time slot R3 of the lower adjacent channel are different to each other, it must be required to change the oscillated frequency of the local oscillator 12 or the transmission frequency of the digital amplifier 81 by the processor 91. Furthermore, it must be required to change the oscillated frequency of the oscillator 87 in the phase synchronous circuit. Specifically, the processor 91 transmits control signals through the bus signal line 92 so that the signal component of the upper adjacent channel can be eliminated at the timing of the time slot R1. At the timing of the time slot R3, the processor 91 transmits the control signal to the local oscillator 12, the digital amplifier 81, and the oscillator 87 through the bus signal line 92 so that the signal component of the lower adjacent channel can be eliminated.

The function of the interference radio wave elimination device of the seventh embodiment is not limited by the above described example, for example, the canceler shown in FIG. 17 can cancel an optional TDMA time slot of an optional n-th adjacent channel other than the adjacent channel.

As described above, because the interference radio wave elimination device of the seventh embodiment comprises phase difference detection means for detecting the phase difference between the interference frequency signal included in the input signal received through the input terminal and the internally reproduced interference frequency signal, the phase difference compensation means for compensating the phase difference, and the control means for controlling to eliminate the interference frequency signal components corresponding to the time slots, the device can compensate the phase difference between interference frequency signal in the input signal and the internally reproduced elimination signal as the internally reproduced interference frequency signal, and the device can accurately eliminate the interference frequency signal components from the input signal.

Embodiment 8

The interference radio wave elimination device of the eighth embodiment according to the present invention can be applied to receivers which operate based on the TDMA method for interference frequency signals. The interference radio wave elimination device of the eighth embodiment, especially, can be applied to a case where there are a plurality of adjacent channels having different frequencies to each other.

Figure 18:
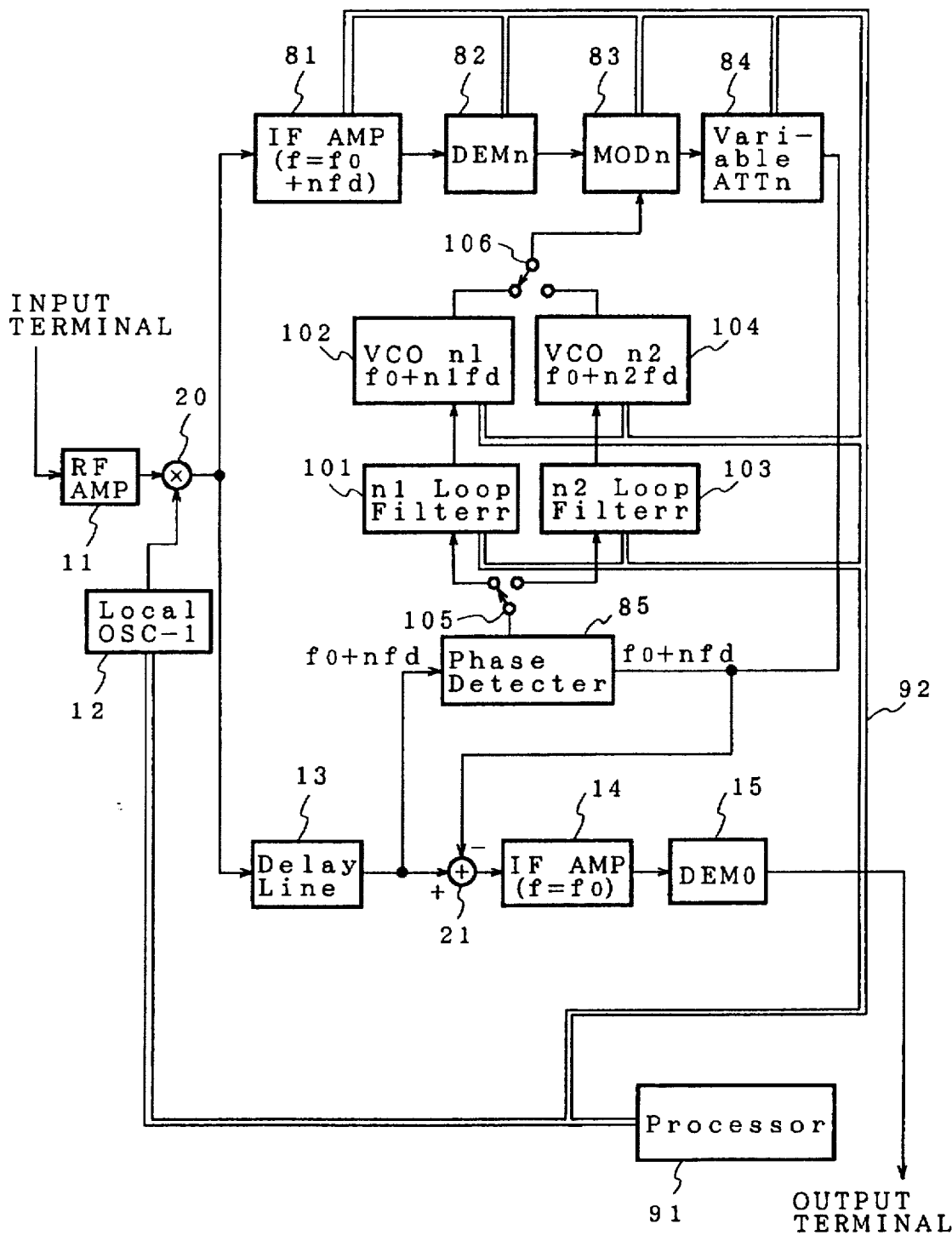
FIG. 18 is a block diagram showing a configuration of the interference radio wave elimination device of the eighth embodiment according to the present invention.

FIG. 18 is a block diagram showing the configuration of the interference radio wave elimination device of the eighth embodiment according to the present invention. FIGS. 19A to 19D are diagrams showing TDMA frame formats applied to the interference radio wave elimination device of the eighth embodiment shown in FIG. 18.

Figure 19A:
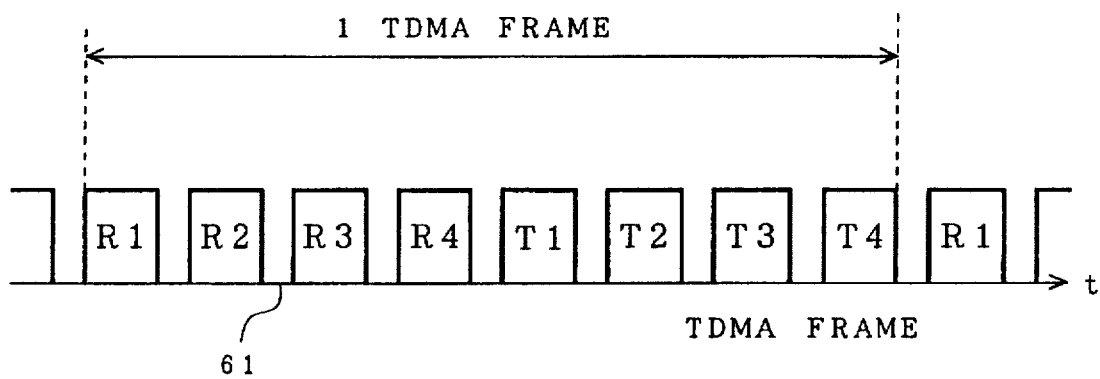
FIGS. 19A to 19D are diagrams showing TDMA frame formats applied to the interference radio wave elimination device of the eighth embodiment shown in FIG. 18.
Figure 19B:
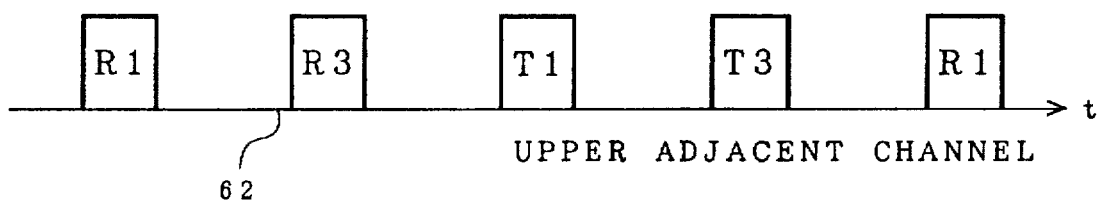
Figure 19C:
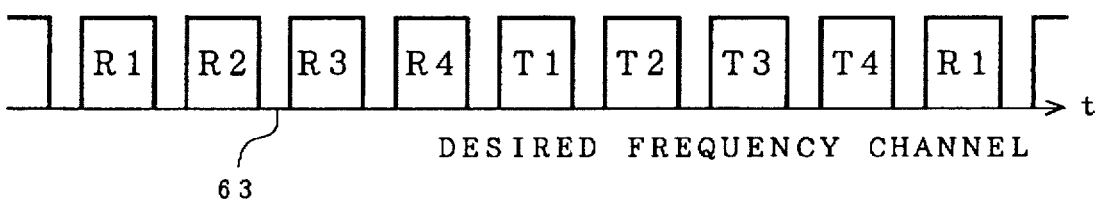
Figure 19D:
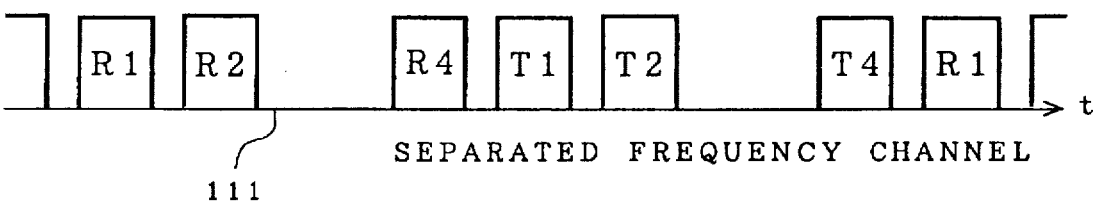

In following explanation, it will be described that the time slot R1 (R1-62) as the interference frequency signal shown in FIG. 19B in the upper adjacent channel 62 and the time slot R2 (R2-111) as the interference frequency signal in the separated adjacent channel 111 are eliminated.

The transmission frequencies of the time slot R1 (R1-61) and the time slot R3 (R3-111) are different in frequency. But, both two time slots are adjacent to each other in time. In this case, it must be required to synchronize these time slots in a high speed rate, but it is difficult to synchronize them when only a single phase synchronize oscillator is incorporated in the device. In order to avoid this, in the interference radio wave elimination device of the eighth embodiment, as shown in FIG. 18, local oscillators 102, 104 corresponding to different transmission frequencies are incorporated and the operations of them are switched by switches 105 and 106.

In FIG. 18, the components designated by reference numbers 11 to 15, 20, 21, 81 to 87, and 91 are same elements used in the interference radio wave elimination device of the seventh embodiment. Therefore the explanation of those are omitted here for brevity. The loop filter 101 and the local oscillator 102 are corresponding to the upper adjacent channel shown in FIG. 19B. The loop filter 103 and the local oscillator 104 are corresponding to the separated adjacent channel shown in FIG. 19D. The reference numbers 105 and 106 designates the switches for selecting one of the paths comprising the loop filter 101 and the local oscillator 102 and the loop filter 103 and the local oscillator 194.

At the timing of the time slot R1, in order to eliminate the upper adjacent channel 62, the processor 91 indicates the switches 105 and 106 through the bus 92 to select the path of the loop filter 101 and the local oscillator 102.

On the other hand, at the timing of the time slot R2, in order to eliminate the separated adjacent channel 111, the processor 91 indicates the switches 105 and 106 through the bus 92 to select the path of the loop filter 103 and the local oscillator 104.

Specifically, the optional adjacent channel canceler including the plurality of PLLs shown in FIG. 18 can eliminate optional n-th adjacent channel by setting optional TDMA time slops in addition to the first adjacent channel.

As described above, the interference radio wave elimination device of the eighth embodiment comprises the phase difference detection means for detecting the phase difference between the interference frequency signal included in the input signal received through the input terminal and the internally reproduced interference frequency signal, the plurality of phase difference compensation means incorporated corresponding to the plurality of interference frequency signals received by the device through the input terminal for compensating the phase differences detected by the phase difference detection means, the selection means for selecting one of the plurality of phase compensation means, and the control means for controlling the operation of the selection means to eliminate the interference frequency signal components corresponding to the time slots.

Because the control means in the interference radio wave elimination device of the configuration described above controls the operation of the selection means, the device can accurately eliminate the interference frequency signal components from the input signal when receivers operate based on the TDMA method, the states of interference frequency signals are different in continuously received time slots.

As described above in detail, the interference radio wave elimination device according to the present invention can eliminate interference frequency signals from input signals by using desired channel frequency signals that have been digitally modulated and interference frequency signals which interfere the desired frequency signals. The device comprises the interference radio frequency signal choosing means for receiving input signals and for choosing the interference radio frequency signals in the input signals, the digital demodulation means for demodulating the interference radio frequency signals chosen by the interference radio frequency choosing means into a digital form, the digital modulation means for modulating internal transmission waves based on interference information obtained by the demodulation process executed by the digital demodulation means and for generating internally reproduced interference frequency signals and the interference radio frequency signal elimination means for eliminating the interference radio frequency signals from the input signals by using internally reproduced interference radio frequency signals modulated by the digital modulation means. Thereby, even if there are the interference frequency signals, the device can prevent the interference and can receive the desired channel frequency signals in good condition and it can kept the radio communication good state.

In addition, the interference radio wave elimination device according to the present invention further comprises delay means for delaying the input signals in time and for providing delayed input signals to the interference radio frequency signal elimination means. Thereby, it can adjust the phase difference between the input signals and the interference frequency signals and accurately eliminate the interference frequency signals.

Furthermore, the interference radio wave elimination device according to the present invention, further comprises adjustment means for adjusting the signal level of the internally reproduced interference radio frequency signals transmitted from the digital modulation means. Thereby, the signal levels of both input signal and interference frequency signal can be adjusted, so that the device can accurately eliminate the interference frequency signal.

Moreover, the interference radio wave elimination device according to the present invention, further comprises a plurality of stages, each stage comprises the interference radio frequency signal elimination means, the digital demodulation means, and the digital modulation means. Thereby, the plurality of stages eliminate a plurality of interference radio frequency signals included in the input signals. Even if a plurality of interference frequency signals are included in the input signal, the device can accurately eliminate the interference frequency signals.

In addition, the interference radio wave elimination device according to the present invention, further comprises control means for controlling operation of eliminating the interference radio frequency signals when the input signal comprises a plurality of time slotted signals and there is an interference time slotted signal in adjacent channels of a desired channel to be used corresponding to each of the plurality of time slotted signals. Thereby, when a receiver operates based on TDMA method and the states of interference frequency signals in each time slot are different to each other, the device can accurately eliminate the interference frequency signals.

Furthermore, the interference radio wave elimination device according to the present invention, further comprises a phase difference detection means for detecting phase differences between the interference radio frequency signals included in the input signals which are provided to the interference radio frequency signal elimination means and internally reproduced interference signals, a plurality of phase compensation means, placed corresponding to the plurality of interference radio frequency signals inputted to the interference radio wave elimination device, for compensating the phase differences of the internally reproduced interference radio frequency signals based on the phase difference detected by the phase difference detection means, and selection means for selecting one of the plurality of phase difference compensation means. The control means controls the elimination operation for eliminating the interference radio frequency signals from the input signals corresponding to time slotted signals included input signals. Accordingly, when a receiver including this device operates based on TDMA method and the states of interference frequency signals are different in continuously received time slots, the device can process the interference frequency signals in a high speed rate and the device can accurately eliminate the interference frequency signals.

Moreover, the interference radio wave elimination device according to the present invention, further comprises a phase difference detection means for detecting phase differences between the interference radio frequency signals included in the input signals which are provided to the interference radio frequency signal elimination means and internally reproduced interference signals, and phase compensation means for compensating the phase differences of the internally reproduced interference radio frequency signals based on the phase difference detected by the phase difference detection means. Thereby, the device can compensate the phase difference between the input signal and elimination signal, so that the device can accurately eliminate the interference frequency signals.

Furthermore, the interference radio wave elimination method according to the present invention is a method to eliminate interference frequency signals from input signals by using desired channel frequency signals that have been digitally modulated and interference frequency signals which interfere the desired frequency signals. The method comprises, a step of receiving input signals including desired radio frequency signals and interference radio frequency signals to interfere the desired radio frequency signals and of choosing the interference radio frequency signals from the input signals, a step of demodulating the interference radio frequency signals chosen by the interference radio frequency choosing step in a digital form, a step of modulating internal transmission waves in a digital form based on interference information obtained by the demodulation process executed by the digital demodulation step, and a step of eliminating the interference radio frequency signals from the input signals by using internally reproduced interference radio frequency signals modulated by the digital modulation step. Thereby, even if there are the interference frequency signals, the method can prevent the interference and can receive the desired channel frequency signals in good condition and it can kept the radio communication a good state.

Although the present invention has been described and illustrated in detail, it is clearly understood that the same is by way of illustration and example only and is not to be taken by way of limitation, the spirit and scope of the present invention being limited only by the term of the appended claims

What is claimed is:

1. An interference radio wave elimination device comprising
- a plurality of stages of interference signal processing means, each stage comprises:
  - interference radio frequency signal choosing means for receiving input signals that include desired radio frequency signals and interference radio frequency signals which interfere with the desired radio frequency signals, and for choosing the interference radio frequency signals in the input signals,
  - digital demodulation means for demodulating the interference radio frequency signals chosen by the interference radio frequency choosing means into a digital form, and
  - digital modulation means for modulating internal carrier signals based on interference information obtained by the demodulation process executed by the digital demodulation means and for generating internally reproduced interference frequency signals,
- wherein the plurality of stages process a plurality of interference radio frequency signals included in the input signals; and
- interference radio frequency signal elimination means for eliminating the interference radio frequency signals from the input signals by using internally reproduced interference radio frequency signals modulated by the digital modulation means.

2. An interference radio wave elimination device, comprising:
- interference radio frequency signal choosing means for receiving input signals that include desired radio frequency signals and interference radio frequency signals which interfere with the desired radio frequency signals, and for choosing the interference radio frequency signals in the input signals;
- digital demodulation means for demodulating the interference radio frequency signals chosen by the interference radio frequency choosing means into a digital form;
- digital modulation means for modulating internal carrier signals based on interference information obtained by the demodulation process executed by the digital demodulation means and for generating internally reproduced interference frequency signals;
- interference radio frequency signal elimination means for eliminating the interference radio frequency signals from the input signals by using internally reproduced interference radio frequency signals modulated by the digital modulation means; and
- control means for controlling operation of eliminating the interference radio frequency signals when the input signal comprises a plurality of time slotted signals and there is an interference time slotted signal in adjacent channels of a desired channel to be used corresponding to each of the plurality of time slotted signals.

3. An interference radio wave elimination device as claimed in claim 2, further comprises:
- a phase difference detection means for detecting phase differences between the interference radio frequency signals included in the input signals which are provided to the interference radio frequency signal elimination means and internally reproduced interference signals;
- a plurality of phase compensation means, placed corresponding to the plurality of interference radio frequency signals inputted to the interference radio wave elimination device, for compensating the phase differences between the interference radio frequency signals and the internally reproduced interference radio frequency signals based on the phase difference detected by the phase difference detection means; and
- selection means for selecting one of the plurality of phase difference compensation means,
- wherein the control means controls the elimination operation for eliminating the interference radio frequency signals from the input signals corresponding to time slotted signals included input signals.

4. An interference radio wave elimination device, comprising:
- interference radio frequency signal choosing means for receiving input signals that include desired radio frequency signals and interference radio frequency signals which interfere with the desired radio frequency signals, and for choosing the interference radio frequency signals in the input signals;
- digital demodulation means for demodulating the interference radio frequency signals chosen by the interference radio frequency choosing means into a digital form;
- digital modulation means for modulating internal carrier signals based on interference information obtained by the demodulation process executed by the digital demodulation means and for generating internally reproduced interference frequency signals;
- interference radio frequency signal elimination means for eliminating the interference radio frequency signals from the input signals by using internally reproduced interference radio frequency signals modulated by the digital modulation means;
- a phase difference detection means for detecting phase differences between the interference radio frequency signals included in the input signals which are provided to the interference radio frequency signal elimination means and internally reproduced interference signals; and
- phase compensation means for compensating the phase differences between the interference radio frequency signals and the internally reproduced interference radio frequency signals based on the phase difference detected by the phase difference detection means.

* * * * *